(12) United States Patent
Simmons, III

(10) Patent No.: US 7,496,116 B2
(45) Date of Patent: Feb. 24, 2009

(54) SWITCHING ARRANGEMENT AND METHOD FOR COMMUNICATIONS PLATFORM

(76) Inventor: George Simmons, III, 1960 E. 18Th St., Erie, PA (US) 16510-1104

( * ) Notice: Subject to any disclaimer, the term of this patent is extended or adjusted under 35 U.S.C. 154(b) by 776 days.

(21) Appl. No.: 10/846,730

(22) Filed: May 14, 2004

(65) Prior Publication Data

US 2004/0228369 A1    Nov. 18, 2004

Related U.S. Application Data

(63) Continuation-in-part of application No. 10/249,873, filed on May 14, 2003, now abandoned.

(51) Int. Cl.
  *H04J 3/02*    (2006.01)
(52) U.S. Cl. .................. 370/537; 370/540; 370/541
(58) Field of Classification Search ............... 370/537, 370/540, 541
  See application file for complete search history.

(56) References Cited

U.S. PATENT DOCUMENTS

| | | | |
|---|---|---|---|
| 5,353,334 A | 10/1994 | O'Sullivan | 379/59 |
| 5,570,389 A | 10/1996 | Rossi | 375/220 |
| 5,598,401 A | 1/1997 | Blackwell et al. | 379/94 |
| 5,602,902 A | 2/1997 | Satterlund et al. | 379/59 |
| 5,757,792 A | 5/1998 | Aoki | 370/347 |
| 5,943,404 A | 8/1999 | Sansom et al. | 379/93.06 |
| 6,112,084 A | 8/2000 | Sicher et al. | 455/426 |
| 6,128,336 A | 10/2000 | Rossi | 375/222 |
| 6,130,883 A | 10/2000 | Spear et al. | 370/328 |
| 6,205,124 B1 | 3/2001 | Hamdi | 370/260 |
| 6,243,377 B1 | 6/2001 | Phillips et al. | 370/354 |
| 6,256,298 B1 | 7/2001 | Nakajo | 370/328 |
| 6,307,880 B1 | 10/2001 | Evans et al. | 375/222 |
| 6,366,609 B1 | 4/2002 | Rossi | 375/222 |
| 6,434,125 B1 | 8/2002 | Marks et al. | 370/328 |
| 6,434,382 B2 | 8/2002 | Liu et al. | 455/426 |
| 6,456,627 B1 | 9/2002 | Frodigh et al. | 370/465 |
| 6,496,486 B2 | 12/2002 | Hamdi | 370/260 |
| 6,519,241 B1 | 2/2003 | Theimer | 370/338 |

(Continued)

OTHER PUBLICATIONS

Butterworth Filters, Internet website located at www.formulations.ab.ca/Expts/80-Web.pdf.

(Continued)

*Primary Examiner*—Ricky Ngo
*Assistant Examiner*—Chandrahas Patel
(74) *Attorney, Agent, or Firm*—Wayne L. Lovercheck

(57) ABSTRACT

A switching arrangement and method allow signals received by a communications platform to be directed to an appropriate interface depending on the type of signal received by an input signal line. A switch element having a switch is responsive to a logic control system that is itself responsive to signals that the input signal line receives. The logic control system may be responsive to any detectable identification, property or quality of the received signal. When the input signal line receives an analog signal, the logic control system detects that the signal is analog and causes the switch element to connect the input signal line to the analog interface with the switch. When the input signal line receives a digital signal, the logic control system detects that the signal is digital and causes the switch element to connect the input signal line to the digital interface with the switch.

173 Claims, 25 Drawing Sheets

U.S. PATENT DOCUMENTS

| | | | |
|---|---|---|---|
| 6,526,068 B2 | 2/2003 | Smith | 370/474 |
| 6,621,802 B1 | 9/2003 | Johansson | 370/329 |
| 6,625,773 B1 | 9/2003 | Boivie et al. | 714/749 |
| 6,640,308 B1 * | 10/2003 | Keyghobad et al. | 713/300 |
| 6,924,755 B1 * | 8/2005 | Callanan et al. | 341/118 |
| 6,937,666 B2 * | 8/2005 | Pasternak et al. | 375/272 |
| 7,099,340 B2 * | 8/2006 | Liva et al. | 370/401 |
| 7,139,252 B2 * | 11/2006 | Babu et al. | 370/312 |
| 7,194,007 B1 * | 3/2007 | Beadle et al. | 370/463 |
| 7,245,583 B1 * | 7/2007 | Renucci | 370/217 |
| 7,248,688 B2 * | 7/2007 | Wellons et al. | 379/265.1 |
| 7,254,159 B1 * | 8/2007 | Lavelle et al. | 375/141 |
| 7,284,269 B2 * | 10/2007 | Marquet et al. | 726/13 |
| 7,289,618 B2 * | 10/2007 | Lim et al. | 379/211.01 |
| 7,295,836 B2 * | 11/2007 | Yach et al. | 455/415 |
| 2001/0002902 A1 | 6/2001 | Hamdi | 370/266 |
| 2002/0001317 A1 | 1/2002 | Herring | 370/493 |
| 2002/0168057 A1 | 11/2002 | Davis | 379/93.35 |
| 2004/0160993 A1 | 8/2004 | Ganton et al. | 370/537 |

OTHER PUBLICATIONS

ECPE 71L—Appendix D—7400 Series Gates, Internet website located at www1.uop/edu.eng/courses/ecpe/ecpe71/sp04/appxd.pdf.
EET 419-420 Project Proposal, Fall 2000, Group 4, D. J Lighting Systems.
Modems—pages from Kelkoo Computing web site.
Introducing Nios II, The World's Most Versatile Processor—pages from Altera web site.
DSP Tutorial—pages from WAVE Report web site.
WAP Over Bluetooth—pages from Nokia web site.
Selected pages from Digital Logic Projects Workbook II by RadioShack.
Intel Operational Amplifiers—Op-Amp Tutorial.
How To Use Your CDMA Cell Phone as a USB Modem on Mac OS X—pages from mac.com.
Three Wireless Wares—pages from computerbits.com.
The 1-to-2 Line Decoder/Demultiplexer—pages from play-hookey.com.
What is a Modem and How Does It Work?—from Washington.edu.
DCB 900 Mhz and 2.4 Ghz Wireless—from debnet.com.
Sierra Wirelss AirCard® 550 Wireless Network Card Operating on CDMA 2000 1X Networks—from sierrawireless.com.
NetVision® Data Phone Portable Voice and Data Terminal—from symbol.com.
NetVision® Phone IEEE 802.11, Frequency Hopping—from symbol.com.
NetVision® Phone IEEE 802.11b, Direct Sequence—from symbol.com.
How PDAs Work—from electronics.howstuffworks.com.
How Web Servers Work—from computer.howstuffworks.com.
How Cell Phones Work—from electronics.howstuffworks.com.
How Wireless Internet Works—from electronics.howstuffworks.com.

* cited by examiner

```
int main ()
{
    string ISP, ID, Password;
    cout << "Enter ISP number:";
    cin >> ISP;
    cout << "Enter ID:";
    cin >> ID;
    cout << "Enter Password:";
    cin >> Password;
```

Fig. 4

SWITCHING ARRANGEMENT AND METHOD FOR COMMUNICATIONS PLATFORM

This application is a continuation in part of U.S. patent application Ser. No. 10/249,873, filed May 14, 2003, now abandoned which is incorporated herein by reference.

BACKGROUND

Electronic communication devices transfer information by transmitting and receiving electronic signals across distances. Prior to transmission, a signal must be converted or modulated into an electronic signal format that is suitable for the medium of the transmission, which may be wireless or be made via wire, optical cable or another medium. The format of the modulated signal must also be such that the signal will be understandable or capable of conversion by the equipment employed to receive the signal.

Though specific signal formats vary greatly, it is common for transmissions to be made in formats that are either analog or digital. Whether such transmissions are made in a digital or analog format will often depend on the purpose and type of equipment with which the signal is associated. For example, it may be appropriate to transmit a signal in an analog format for a sound-producing or voice device such as a radio or telephone. It may also be appropriate to transmit a signal in a digital format for a data device such as a computer network, digital telephone, or digital television signal transmission.

With the development of mobile communication devices such as cellular telephones and portable laptop computers that have wireless Internet capabilities, it has become increasingly important for individual components of such devices to be reduced in size for portability, especially as such devices become increasingly complex and equipped with an increasing number of components and capabilities. Required reductions in apparatus and component size, increases in component numbers, and other considerations can force limitations on the number of communication channels that are available. Where a limited number of communication channels are available, it may be necessary for multiple devices to share one or more of the channels.

Where multiple devices share one or more of the available channels, each channel must be itself capable of accommodating signals of the type used by each device sharing the channel. For example, where a communications platform includes a portable computer having a modem that operates with a cellular telephone to connect to a remote network connection, it may be necessary for a single shared channel to accommodate both the data (digital) signals of the portable computer and voice (analog) signals of the cellular telephone.

Ordinarily, a shared channel will accommodate only analog or digital signals at any single point in time. However, most devices can only recognize signals of a particular signal type. If one or more communication channels of a communications platform are shared, a signal received through a particular input signal line of the channel must therefore be directed to the interface of the appropriate device or devices of the platform. To properly direct an incoming signal to the appropriate interface, a communications platform must be able to both identify the type of signal that is being received and have the ability to direct the signal to an appropriate interface according to the type of signal that has been identified.

SUMMARY

The invention includes a switching arrangement and method for a communications platform. Signals received by the communications platform can be directed to either an analog or digital interface depending on the type of signal that is received. One or more input signal lines receive signals that have been received by the communications platform. A switch element includes one or more switches. The switch element is connected to one or more of the input signal lines and is responsive to a logic control system. The logic control system is itself responsive to signals that are received by one or more of the input signal lines connected to the switch element. The logic control system may be responsive to a signal received due to a particular bandwidth, an associated phone or identification number or protocol, or another detectable property or quality of the signal.

If a switch is connected to an analog interface, when a signal received by a connected input signal line is analog, the logic control system detects that an analog signal is being received. In response, the logic control system causes the switch element to use the switch to connect the input signal line to the analog interface, allowing the analog interface to receive the signal. If the same switch is connected to a digital interface, when a signal received by the same input signal line is digital, the logic control system detects that a digital signal is being received. The logic control system then causes the switch element to use the switch to connect the input signal line to the digital interface, allowing the digital interface to receive the signal.

Some embodiments of the invention may include single pole, double throw switches or other types of switches appropriate for a particular application that perform switching operations using either mechanical, solid state, or other appropriate methods. The switching may be conducted at high speeds to alternate the connection between an input signal line and the digital and analog interfaces at a rate that enables the single communication channel to emulate, during a period of time, a simultaneous analog and digital signal connection through one input signal line.

Some embodiments of the invention may include multiple input signal lines that are each connected to a separate switch of the switch element. Each switch may be responsive to the logic control system and allow each input signal line to be selectively connected to an analog or digital interface depending on whether the logic control system detects that an analog or digital signal is being received by the connected input signal line. The logic control system will often allow multiple switches to simultaneously connect input signal lines to an analog interface. However, the logic control system will also often allow only one switch to be connected to a digital interface at a given time.

Those skilled in the art will realize that this invention is capable of embodiments that are different from those shown and that details of the structure of the disclosed switching arrangement and methods can be changed in various manners without departing from the scope of this invention. Accordingly, the drawings and descriptions are to be regarded as including such equivalent switching arrangements and methods as do not depart from the spirit and scope of the invention.

BRIEF DESCRIPTION OF THE DRAWINGS

For a more complete understanding and appreciation of this invention, and many of its advantages, reference will be made to the following detailed description taken in conjunction with the accompanying drawings.

FIG. 4 is a segment of a computer program used to a programmable logic chip according to the invention;

DETAILED DESCRIPTION

Figure 1:
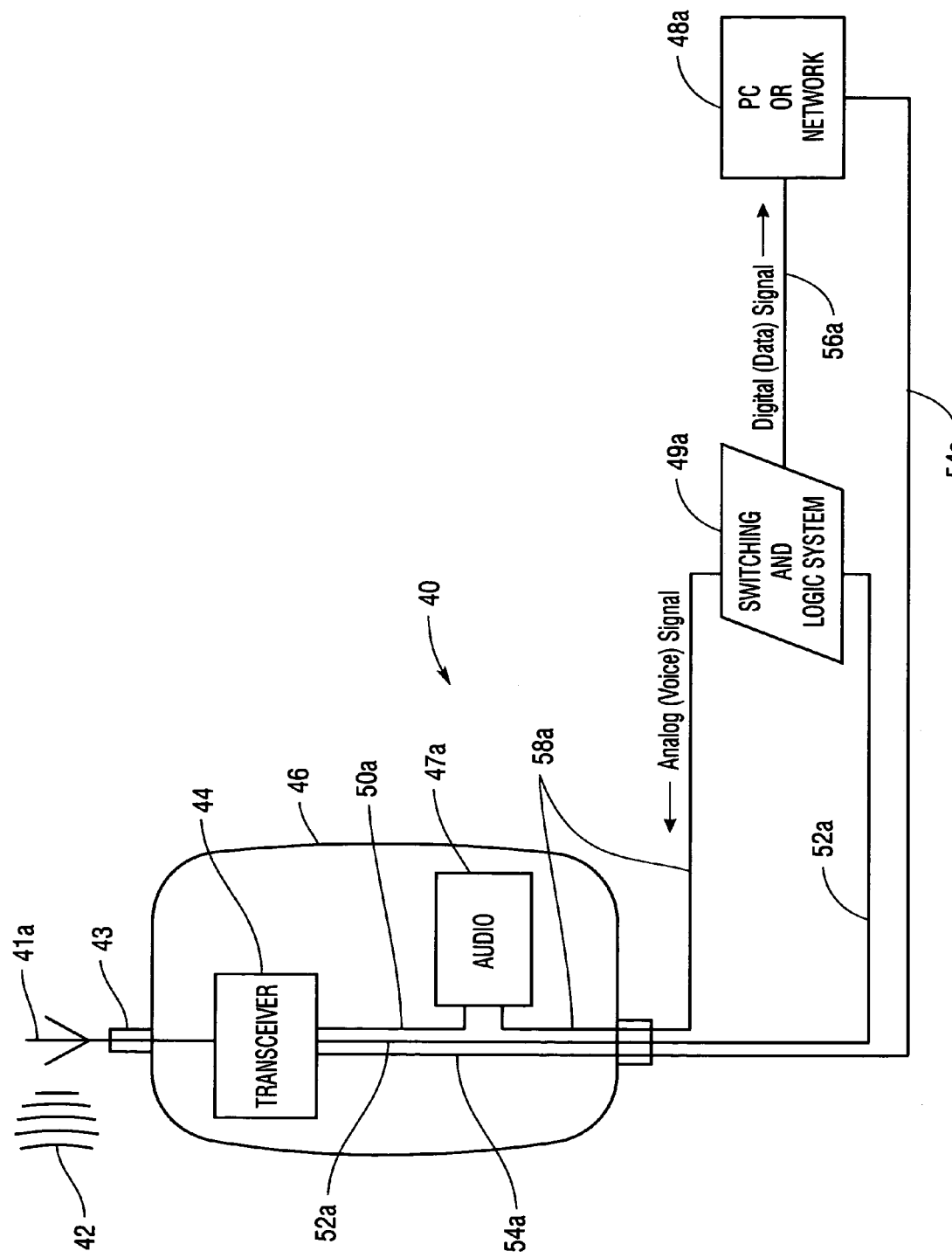
FIG. 1 is an example of a communications platform according to one embodiment of the invention.

Referring to the drawings, similar reference numerals are used to designate the same or corresponding parts throughout the several embodiments and figures. Specific embodiment variations in corresponding parts are denoted with the addition of lower case letters and/or single or multiple prime indicators to reference numerals.

FIG. 1 is a block diagram of one example of a communications platform 40 into which this invention can be incorporated. Wireless modulated signals 42 that are sent and received via a transceiver 44 provide an external signal source/output 41a. The platform 40 includes an antenna 43, a cellular telephone 46 into which the transceiver 44 is integrated, and an analog interface 47a through which voice signals are transferred from the cellular telephone 46 to the transceiver 44 via an analog output line 50a. A digital interface 48a allows for the connection of a personal computer or computer network (not shown) also included with the platform 40.

A switching and logic system 49a directs signals received by the platform 40 and channeled from the transceiver 44 through an input signal line 52a to either the analog interface 47a or digital interface 48a depending on the type of signal that is detected in the input signal line 52a. If the switching and logic system 49a detects the presence of signals that are analog such as voice signals, the switching and logic system 49a connects the input signal line 52a to the audio interface 47a by directing the voice signals through the analog input line 58a. If the switching and logic system 49a detects the presence of signals that are digital such as data signals, the switching and logic system 49a connects the input signal line 52a to the digital interface 48a by directing the voice signals through the digital input line 56a. The analog output line 50a and digital output line 54a allow the analog and digital interfaces 47a and 48a to transmit outgoing signals back to the transceiver 44 for subsequent modulation and wireless transmission.

Although an example communication platform is depicted in FIG. 1 that includes a cellular telephone and a personal computer or network connection, it will be appreciated that the invention can be implemented into other platforms that include devices utilizing either analog or digital signals, and especially combinations of analog and digital equipment. For example, the invention can be implemented into a television in which either a video or audio signal is received in an analog format, with the mated video or audio signal being received in a digital format. The invention can also be implemented into platforms having combinations of either cable or wire-based television or radio devices that are combined with network, computer, navigation, or satellite systems. Other possible platform devices include but are not limited to conventional telephones, electronic games and entertainment devices, measuring devices, various types of positioning equipment, and mobile and non-mobile equipment. Platforms implementing the invention that include any type of equipment utilizing either analog or digital signals are contemplated to be within the intended scope of the invention.

Figure 2:
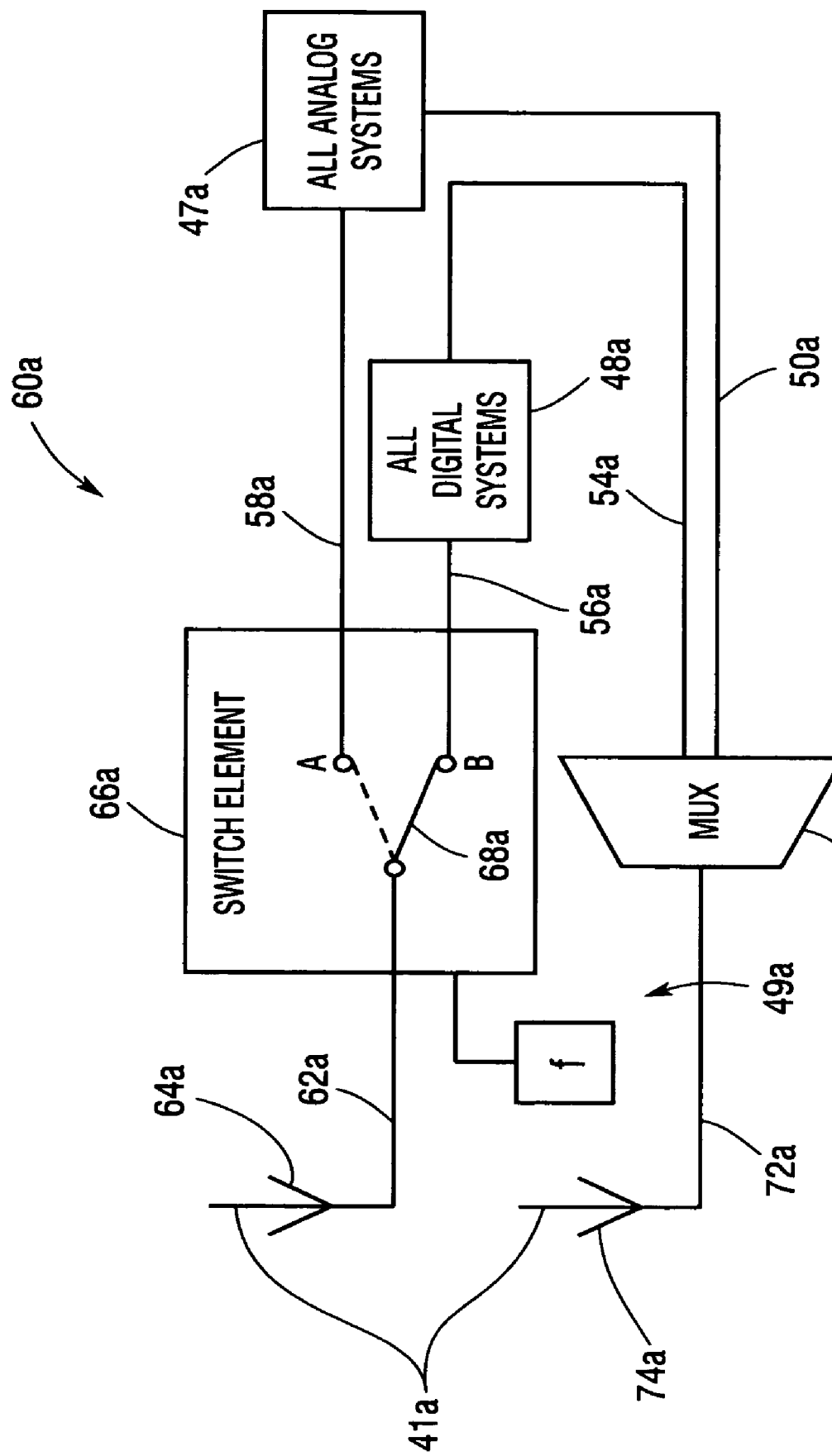
FIG. 2 is a switching arrangement according to one embodiment of the invention.

FIG. 2 depicts a switching arrangement 60a of the invention that could be implemented into the platform 40 of FIG. 1. The switching arrangement 60a includes an input signal line 62a that receives signals received by the platform 40 via the signal source 64a. The switching and logic system 49a includes a switch element 66a having a switch 68a. The switch 68a can be any single pole double throw switching mechanism, such as those included on the Max 4763, Max 4764, and Max 4765, each available from Maxim Integrated Products, and provides selectable connections between the input signal line 62a and positions A and B. It can also be other types of switch configurations appropriate for particular applications, some of which are described below. Although the switch element 66a is shown and described in FIG. 2 as having a mechanically actuated switch 68a to clarify the logical operation of the switching arrangement 60a, those skilled in the art will recognize that in some applications, high speed switching devices may be required or preferred. In some embodiments of the invention, including those utilizing high speed switching, the invention can be effectively implemented through the use of one or more solid state single pole double throw switches included in a comparable switch element. Such high speed switching devices may, in some applications, allow the switching arrangement to emulate a simultaneous connection between one or more input signal line and each of the analog and digital interfaces, creating a substantially simultaneous connection between each input line and interface.

Position A of the switch 68a is connected to the analog input line 58a, leading to the analog interface 47a, while position B of the switch 68a is connected to the digital input line 56a, leading to the digital interface 48a. This configuration allows the switch 68a to act as a channel selector for signals received by the platform at the input signal line 62a via the signal source 64a.

The switching and logic system 49a includes a logic control system, generally designated by the letter f, that is capable of detecting and is responsive to whether signals that are being received by the input signal line 62a are analog or digital. The switch element 66a is in turn responsive to the logic control system f to cause the switch 68a to selectively move to position A or B depending on whether signals being received by the input signal line 62a are analog or digital, to connect received signals to an appropriate interface.

Consider the communications platform 40 of FIG. 1 when an analog voice signal is transmitted in a modulated format from a remote communications tower. The modulated signal 42 is received by the antenna 43 of the cellular telephone 46 and is demodulated into an analog signal by the transceiver 44. The demodulated analog signal then enters the switching arrangement 60a of FIG. 2 at the signal source 64a. The signal is channeled from the signal source 64a to the switch element 66a by the input signal line 62a. The logic control system f detects the presence of the signal in the input signal line 62a and identifies the signal as being analog. Responsively, the logic control system f causes the switch element 66a to move the switch 68a to position A to connect the input signal line 62a to the analog input line 58a and to thereby connect the input signal line 62a to the analog interface 47a. This condition of the switch 68a normally causes the digital interface 48a to be disconnected from the input signal line 62a. Since the cellular telephone 46 is the analog device connected to the analog interface 47a, the cellular telephone 46 can then convert the voice signal to an audible sound.

Now consider the communications platform 40 of FIG. 1 when a signal transmitted in a modulated format from the remote communications tower is a digital data signal. The modulated signal 42 is received by the antenna 43 of the cellular telephone 46 and is demodulated into a digital signal by the transceiver 44. The demodulated digital signal then enters the switching arrangement 60a of FIG. 2 at the signal source 64a. The signal is channeled from the signal source 64a to the switch element 66a by the input signal line 62a. The logic control system f detects the presence of the signal in the input signal line 62a and identifies the signal as being digital. Responsively, the logic control system f causes the switch element 66a to move the switch 68a to position B to connect the input signal line 62a to the digital input line 56a and to thereby connect the input signal line 62a to the digital interface 48a. This condition of the switch 68a normally causes the analog interface 47a to be disconnected from the input signal line 62a. A personal computer or computer network of the platform 40, each being directly or indirectly connected to the digital interface 48a, can then receive and utilize the digitally formatted information or data contained in the digital signal.

Devices connected to either the analog interface 47a or digital interface 48a will also normally be configured to transmit data in an analog or digital format. For example, when a user of the cellular telephone 46 speaks into the microphone (not shown) of the telephone 46, the telephone 46 will generate an analog voice signal that will be transmitted back to the analog interface 47a and be channeled through an analog output line 50a. Computer data generated by one or more computers that are connected to the digital interface 48a may also be transmitted through the digital interface 48a and be channeled through a digital output line 54a for reception by remote computer devices or networks. As shown in FIG. 2, the analog output line 50a and digital output line 54a are both connected to a multiplexer 70a, which can be any standard 2 to 1 multiplexer such as the Max 4783 and Max 4784, both available from Maxim Integrated Products. The multiplexer 70a, a component of transceiver 44, allows both analog and digital signals of either output line to be channeled through a signal output line 72a to a signal output 74a for subsequent modulation by the transceiver 44 (the balance of which is not shown in FIG. 2) for transmission back to the remote communications tower.

Figure 3:
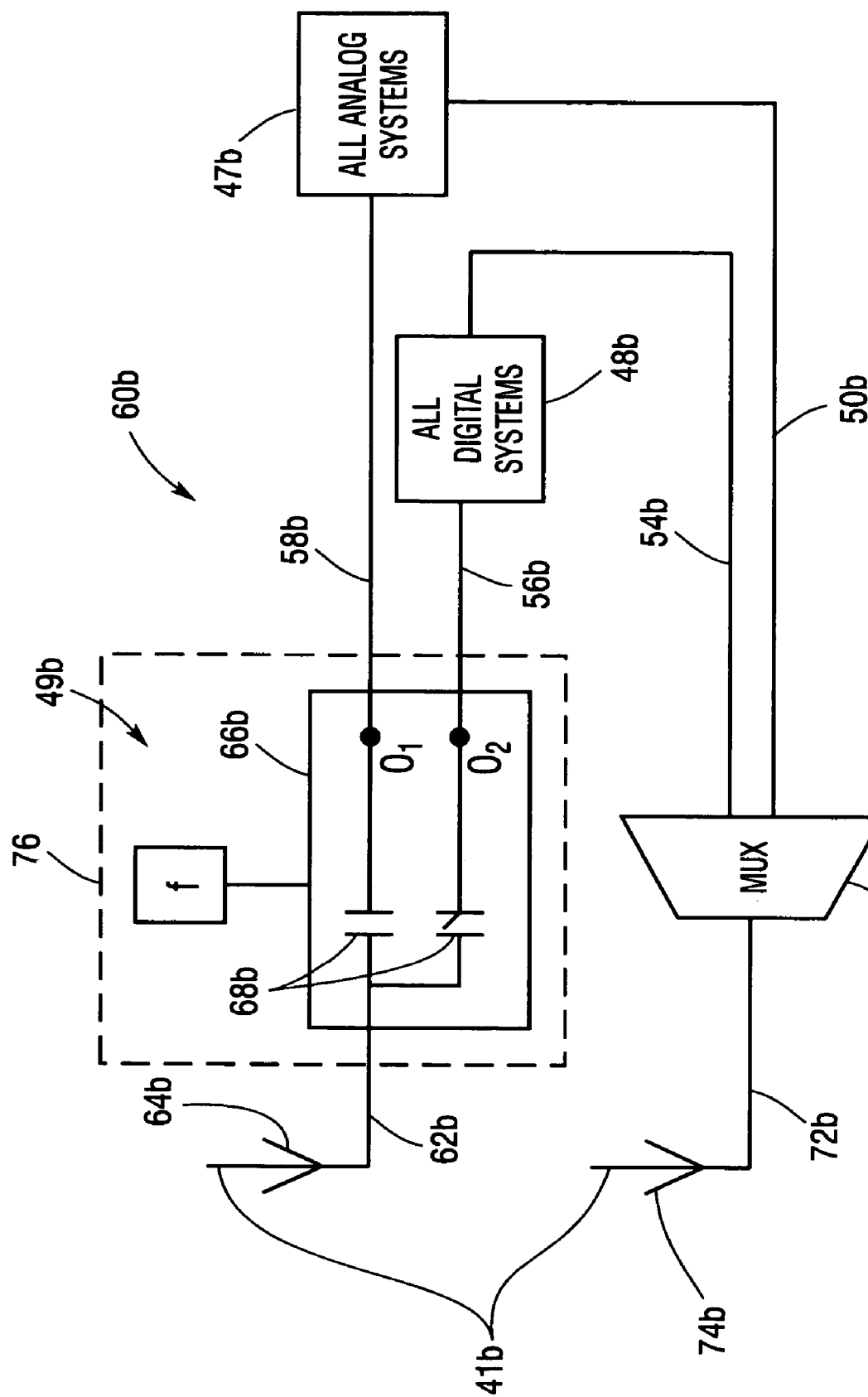
FIG. 3 is a switching arrangement according to one embodiment of the invention.

In some embodiments, such as those requiring high speed switching, it may be preferable or necessary to include a solid state switch element having as switch that is capable of at least single pole and at least double throw switching. Such embodiments may allow for an emulated simultaneous or substantially simultaneous connection between the input signal line and each of the analog and digital interfaces. FIG. 3 depicts a switching arrangement 60b of the invention that is constructed around a programmable logic chip (PLC) 76 having a switching and logic system 49b that includes a switching element 66b in which a solid state, single pole double throw electronic switch 68b that is integrated as part of the PLC 76 and powered by the power supply (not shown) of the PLC 76. Chips such as the PLC 76 are well known in the art and can be custom constructed and/or programmed by either the user or manufacturer, using a suitable chip programming language such as Relay Ladder Logic (RLL), to provide switching logic that is responsive to the logic control system f and equivalent to the mechanical switching arrangement 60a depicted in FIG. 2. Such custom PLCs are commonly built on available CPLD devices such as the Max II CPLD obtainable from manufacturers such as the Altera Corporation of San Jose, Calif.

Being programmed to be responsive to the logic control system f, the RLL programming of the PLC 76 commands the switch element 66b to cause the solid state switch 68b to connect the input signal line 62b to the analog interface 47b via the analog input line 58b when the logic control system f detects the presence of an analog signal in the input signal line 62b. This condition of the solid state switch 68b normally disconnects the digital interface 48b from the input signal line 62b. The RLL programming also causes the solid state switch 68b to connect the input signal line 62b to the digital interface 48b via the digital input line 56b when the logic control system f detects the presence of a digital signal in the input signal line 62b. This condition of the solid state switch 68b normally disconnects the analog interface 47b from the input signal line 62b. Analog and digital signals transmitted by the analog and digital interfaces 47b and 48b are channeled through the analog and digital output lines 50b and 54b, which are coupled into the single signal output line 72b by the multiplexer 70b for transmission via the signal output 74b.

It will be appreciated that the logic control system f can use any of a number of techniques to identify the type of signal present in the input signal line 62b. In addition to the RLL programming, which is primarily responsible for controlling the switching logic functions of the PLC 76, the PLC 76 will normally include an interface for connecting to a personal computer. The PLC 76 can then accept programming instructions from the personal computer that are written in another computer language such as C++, BASIC, FORTRAN, or other similar language. The PLC 76 can be programmed to accept, through initial protocols with an incoming signal, information transmitted from a remote location that enables the PLC 76 to establish a configuration allowing the logic control system f to correctly control the switching logic of the switch element 66b.

For example, FIG. 4 depicts example lines of code from a segment 77 of a program, written in C++, that could be implemented to cause the PLC to identify the type of signal present in the input signal line 62b of the switching arrangement 60b of FIG. 3. The segment 77 would allow for the retrieval of a number of identifying designations associated with the signal being received. The segment 77 includes a subroutine line 78 that opens a subroutine with a subroutine bracket 80. A string definition line 81 defines string variables to be used throughout the subroutine as having the designations "ISP," "ID," and "Password." Particular signal identifiers from a user or external source can then be associated with each string variable and stored into the memory (RAM) of the PLC 76.

An ISP request line 82 instructs the PLC 76 to print a textual line containing the message "Enter ISP number:" on the screen of a user interface, such as the dialing screen of the cellular telephone 46 of FIG. 1. An ISP input line 84 instructs the PLC 76 to receive a string that will stored as the ISP number and which can the user can enter into memory using the interface, such as with the dial pad of the cellular telephone 46. The PLC 76 then stores the entered string in the memory of the PLC 76 with the assigned string variable designation of "ISP." Normally the PLC 76 will be pre-programmed to perform the signal identification operation of the logic control system f and will associate a particular string variable having the ISP number with a type of signal used by devices having the same ISP number. Once the string "ISP" has been stored in the memory of the PLC 76 by the segment 77 of the C++ program, the PLC 76 will, due to its pre-programmed recognition of the variable "ISP," utilize its RLL programming to cause the switch 68b to connect the input signal line 62b to the appropriate analog or digital interface 47b or 48b. The selected interface will correspond to the type of signal used by a device or devices having an ISP number that is the same as the ISP number designated by the string variable "ISP."

The PLC 76 may also require that the user enter other signal identifiers and require that any one or all of the identifiers correspond to those used by a device or devices having identifiers that are the same as the identifiers entered by the user. The program segment 77 of FIG. 4 includes an ID request line 86 which prints the text "Enter ID:" on the screen of the user interface. The ID input line 88 then instructs the PLC 76 to receive a value for the string variable "ID" which can be entered by the user and which is then stored in memory as the string variable designated "ID."

The string variable "ID" may correspond to a remote tower identification number, satellite signal identification number, or other identification designation that corresponds to equipment, recognized by the PLC 76 in performing the signal identification operation of the logic control system f, as being associated with analog or digital signals. A password request line 90 is also included with the program segment 77 that prompts the user with the text "Enter password:" and a password input line 92 receives the user-entered password under the designated string variable "Password." The PLC 76 may recognize the stored string "Password" as being associated with an analog or digital signal and effect appropriate switching logic accordingly. However, it will be appreciated that the PLC 76 may be programmed to effect switching based on any one or any combination of identifiers that it receives from the user and this will depend on the circumstances or requirements of the particular platform. Other possible user-designated signal identifiers include phone numbers, specified signal bandwidths, Internet addresses, communications signature protocols, and Internet protocol addresses.

Although the invention has been shown and described as having a program segment that prompts the user for manually-entered signal identifiers, it will be appreciated that the PLC 76 can perform the signal identification operation of the logic control system f through other means as well. For example, the PLC 76 can be programmed to recognize the phone number dialed by a user of the cellular telephone 46 of FIG. 1 and be further programmed to associate the dialed phone number with a phone number known to be used by remote analog or digital equipment. The PLC 76 can also be programmed to recognize identifiers associated with incoming signals, such as caller identification codes or other attributes communicated as string variables by the incoming signals. For example, if an incoming caller identification code includes string information regarding an ISP number, ID number, and/or password associated with the signal, the program segment 77 of FIG. 4 can be modified by removing the ISP, ID, and Password request lines 82, 86, and 90 and by retaining one or more of the remaining ISP, ID, and input lines 84, 88, and 92 to allow corresponding inputs for the string variables "ISP," "ID," and/or "Password" to be supplied directly from the caller identification codes.

Figure 5:
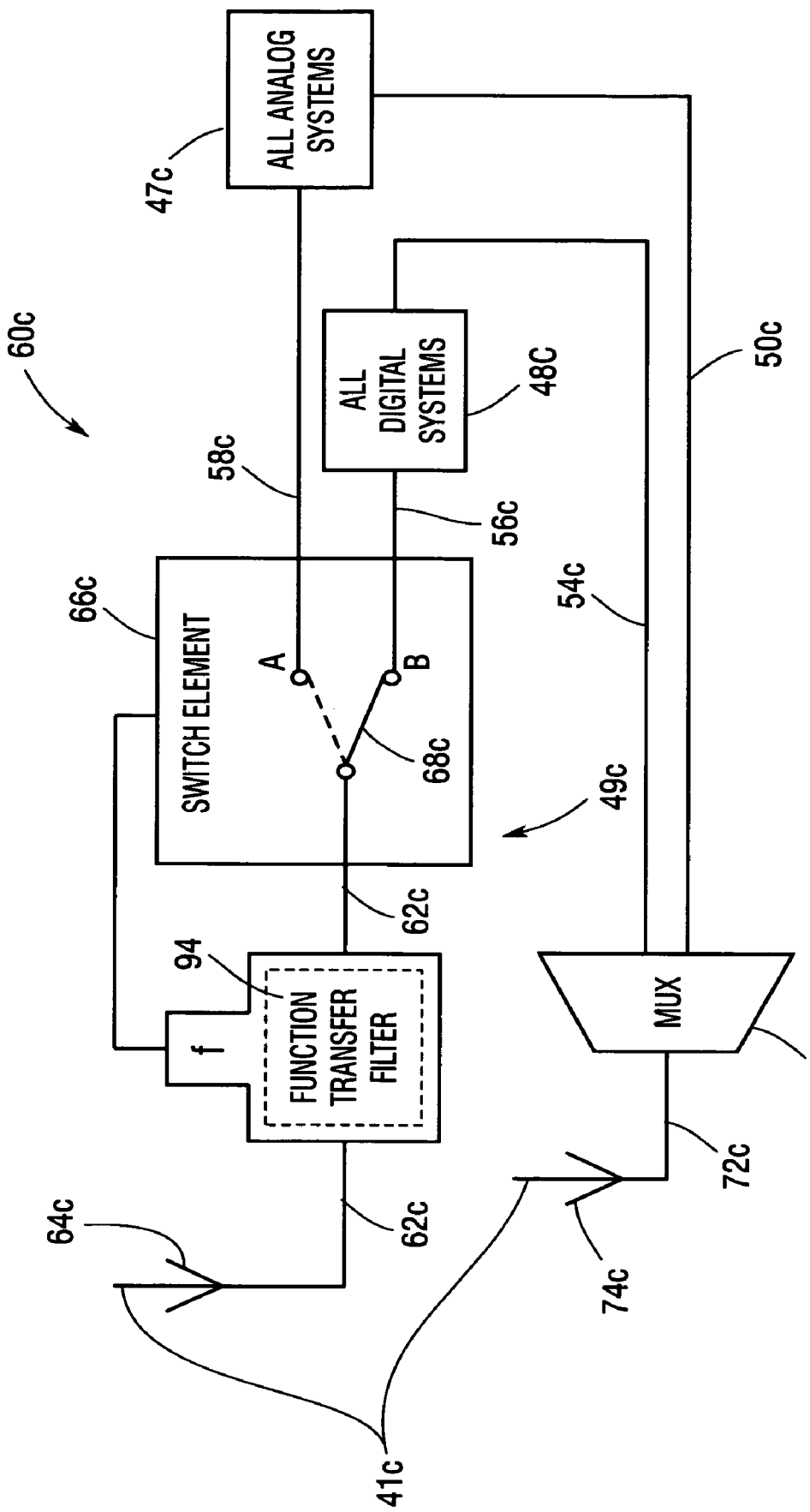
FIG. 5 is a switching arrangement according to one embodiment of the invention.
Figure 6:
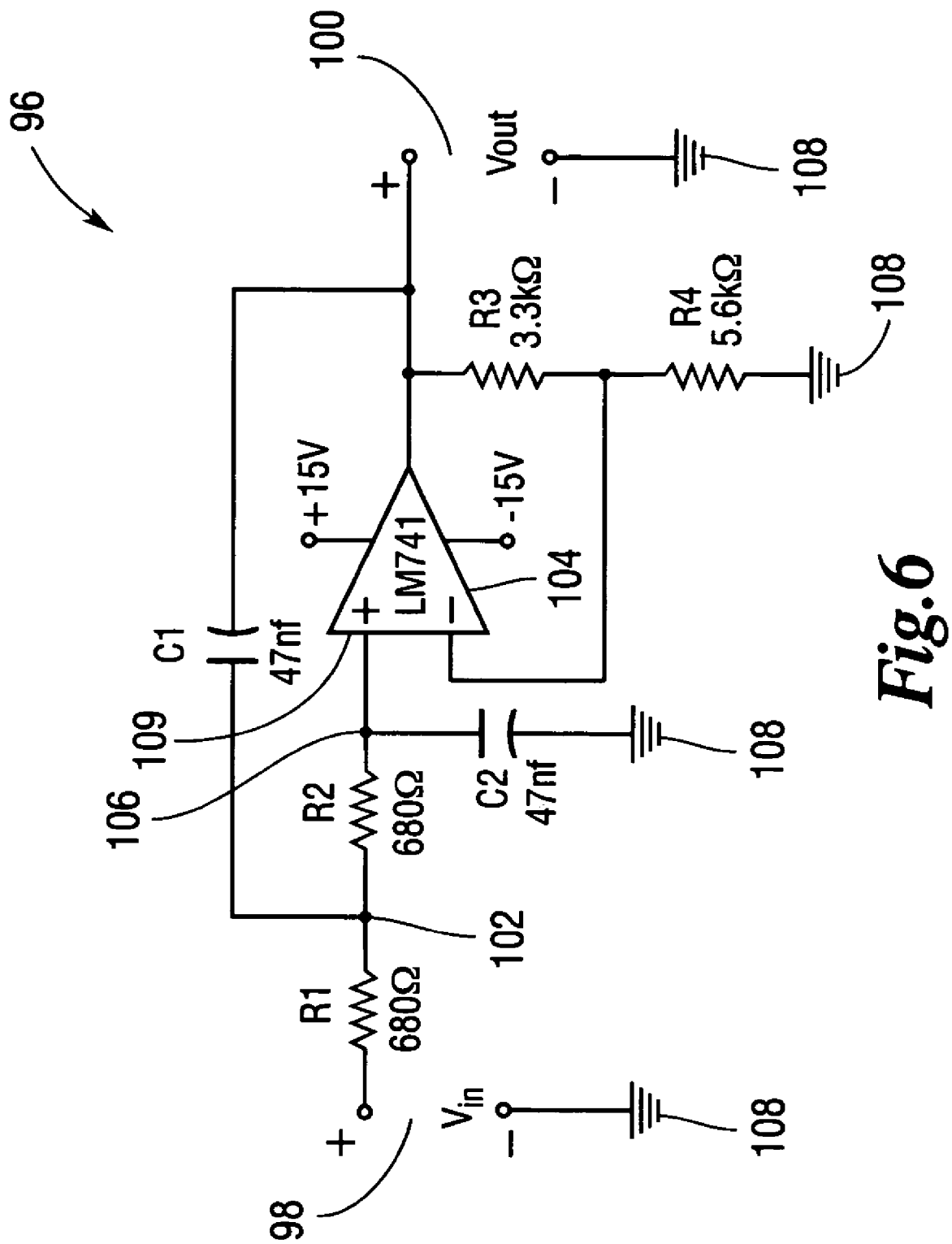
FIG. 6 is an electronic diagram of a narrow bandwidth pass filter according to one embodiment of the invention.

Some embodiments of the invention allow the logic control system f to identify the type of signal being received based on detectable properties of the signal itself. FIG. 5 depicts a switching arrangement 60c of the invention in which a function transfer filter 94 is integrated into the switching and logic system 49c. The use of this switching arrangement 60c is appropriate for distinguishing between analog and digital signals when one signal type is assigned to one or more dedicated bandwidth ranges while all bandwidths outside of the assigned ranges are dedicated to signals of the other type. The function transfer filter 94 is located along the input signal line 62c and allows signals present in the line 62c to pass from the signal source 62c to the switch element 66c without obstructing the passage of the signal therebetween. The signal can then be selectively connected to the analog interface 47c or digital interface 48c with the switch 68c depending on the signal type detected by the logic control system f FIG. 6 is a circuit diagram of a narrow bandwidth bypass filter 96 that can be appropriately implemented as the function transfer filter 94 depicted in FIG. 5 to carry out the signal type detection function of the logic control system f. The bypass filter 96 can be used to produce a binary logic signal and cut out that can be assigned to indicate the presence of digital and analog signals where either signal type is assigned to the exclusive signal amplitude bandwidth range of approximately ±20 dB to ±60 dB.

Consider the bypass filter 96 of FIG. 6 where analog signals are assigned to the narrow bandwidth range of ±20 dB to ±60 dB and where digital signals are assigned to all other bandwidths. The bypass filter 96 includes a voltage input 98 for receiving a signal voltage $V_{in}$ from the input signal line 62c that corresponds in direct proportion to the amplitude of the signal being received, expressed in decibels (dB), through the relation $$A = 20 \log_{10}(V_{out}/V_{in})$$

where A is the amplitude in decibels (dB) of the signal present in the input signal line 62c of the switching arrangement 60c and $V_{out}$ is the voltage present at voltage output 100 of the bypass filter 96. As best understood by comparing FIGS. 5 and 6 with the bandwidth chart in FIG. 7 for the bypass filter 96, the bypass filter 96 is designed to produce a positive voltage (TRUE) condition so long as signals received by the input signal line 62c are digital, digital signals being restricted to amplitudes other than between ±20 dB ($A_1$) and ±60 dB ($A_2$). A cut out (FALSE) condition exists when analog signals are received, analog signals being restricted to amplitudes between ±20 dB ($A_1$) and ±60 dB ($A_2$). The bypass filter 96 includes output resistors R3 and R4 to remove background noise and to prevent transient currents from affecting the voltage conditions at the voltage output 100 and throughout the circuitry of the bypass filter 96. The voltage conditions at the voltage output 100 provide the signal type detection logic of the logic control system f.

Figure 7:
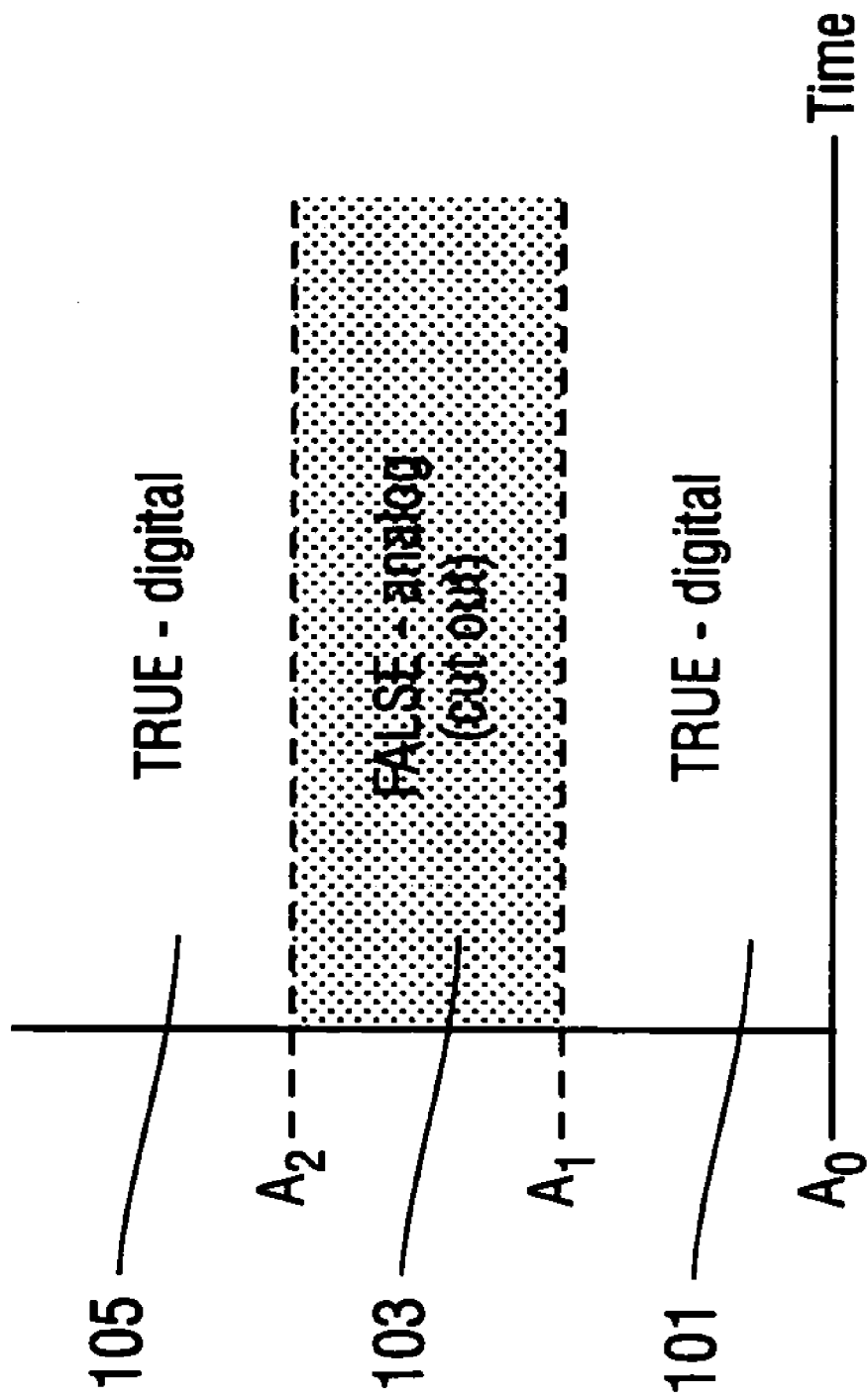
FIG. 7 is a bandwidth chart for the narrow bandwidth pass filter of FIG. 6.

Consider a signal received by the input signal line 62c having an amplitude of 0 to ±20 dB ($A_1$), reflected in the low band 101 of FIG. 7. The signal will result in a corresponding signal voltage $V_{in}$, proportional to the magnitude of the signal amplitude, at the voltage input 98. The signal voltage will normally be sufficient for the signal to bypass an initial resistor R1 but insufficient for the signal voltage to bypass a secondary resistor R2. As a result, current will travel from the low band point 102 through the low band capacitor C1 to produce a positive voltage (TRUE) condition at the voltage output 100. This will provide the logic signal of the logic control system f indicating that a digital signal is present at the input signal line 62c.

Next consider a signal received by the input signal line 62c having an amplitude of between ±20 dB ($A_1$) $_{and}$ ±60 dB ($A_2$), reflected in the middle band 103 of FIG. 7. The signal will result in a corresponding magnitude proportional signal voltage $V_{in}$ at the voltage input 98 normally sufficient for the signal to bypass both the initial resistor R1 and secondary resistor R2. However, the signal voltage will normally be unable to overcome the additional resistance created by the additional line resistance between the secondary resistor R2 and a filter amplifier 104. As a result, current will travel from the middle band point 106 through the middle band capacitor C2 to electrical ground 108 leaving an absence of voltage or "cut out" (FALSE) voltage condition at the voltage output 100. This will provide the logic signal of the logic control system f indicating that an analog signal is present at the input signal line 62c.

Now consider a signal received by the input signal line 62c having an amplitude that is greater than the magnitude of ±60 dB ($A_2$), reflected in the high band 105 of FIG. 7. The signal results in a corresponding proportional signal voltage $V_{in}$ at the voltage input 98 normally sufficient for the signal to bypass the initial and secondary resistors R1 and R2 and overcome the additional resistance created by the additional line resistance between the secondary resistor R2 and the filter amplifier 104. The filter amplifier 104 is of a type well known in the art, such as the LM741 operational amplifier available from manufacturers such as Maxim Integrated Products, and is capable of amplifying the signal, which is received at the positive input 109 of the amplifier 104, to produce a positive voltage (TRUE) condition at the voltage output 100. This will provide the logic signal of the logic control system f indicating that a digital signal is present at the input signal line 62c.

Figure 8:
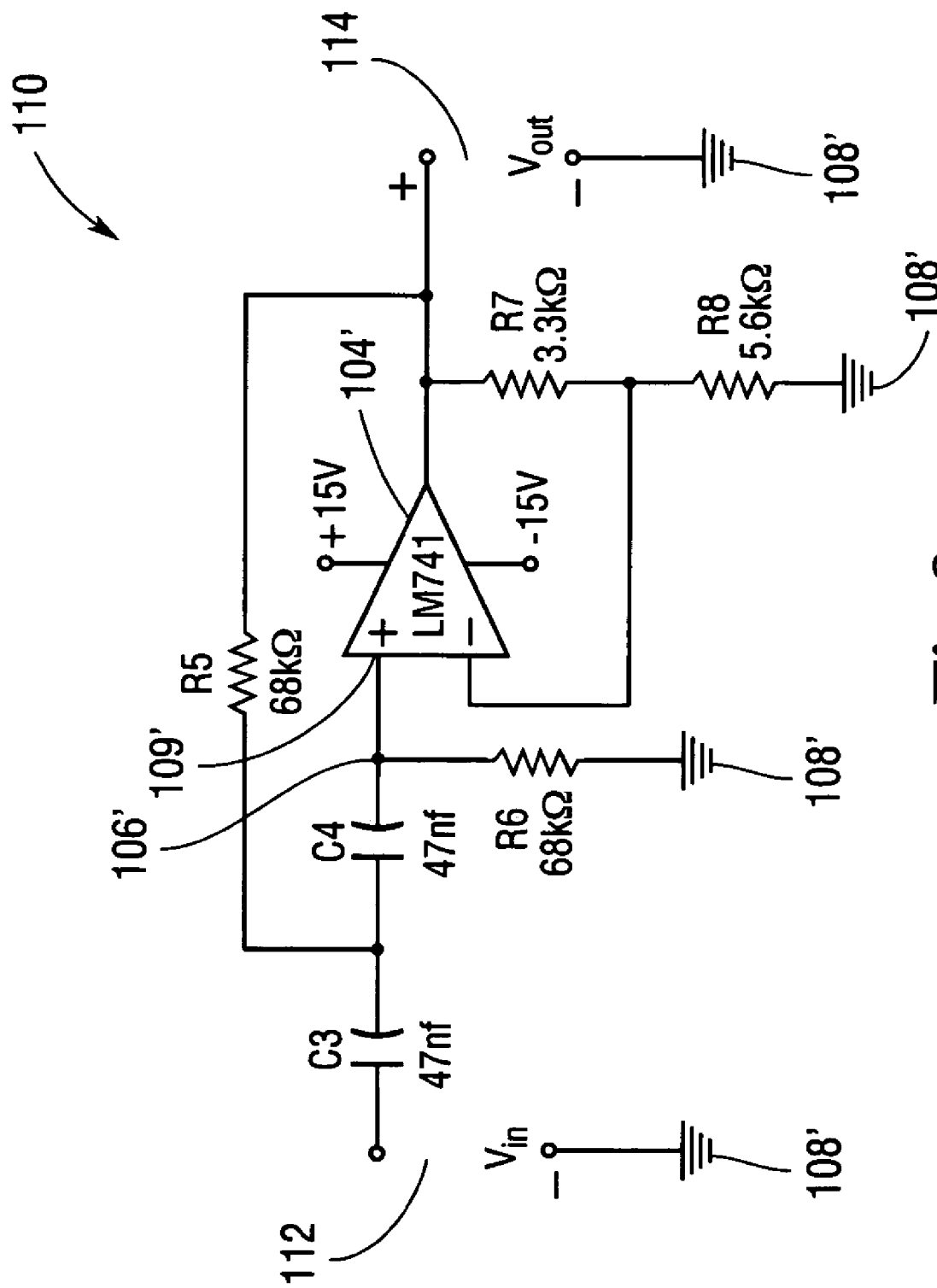
FIG. 8 is an electronic diagram of an active high pass filter according to one embodiment of the invention.

It will be appreciated that devices that produce different logic signals for similar signal amplitude bandwidth ranges can also be appropriately implemented in the invention as long as the logic produced by such devices corresponds to other predetermined and exclusive signal amplitude bandwidth ranges for each type of signal. For example, FIG. 8 is a circuit diagram of an active high pass filter 110 that can also be appropriately implemented as the function transfer filter 94 depicted in FIG. 5 to carry out the signal type detection function of the logic control system f. The high pass filter 110 can be used to produce a binary logic signal and cut out that can be assigned to indicate the presence of digital and analog signals where either signal type is assigned to an exclusive signal amplitude bandwidth range of approximately 0 to ±20 dB or to the range of approximately greater than the magnitude of ±20 dB.

Consider the high pass filter 110 of FIG. 8 where analog signals are assigned to the bandwidth range of 0 to ±20 dB and where digital signals are assigned to bandwidths with magnitudes greater than the ±20 dB level. The high pass filter 110 includes a voltage input 112 for receiving a signal voltage $V_{in}$ from the input signal line 62c corresponding in direct proportion to the amplitude of the signal being received, through the same logarithmic function as the filter of FIG. 6, where A is the amplitude in decibels (dB) of the signal present in the input signal line 62c of the switching arrangement 60c and $V_{out}$ is the voltage present at voltage output 114 of the high pass filter 110.

Figure 9:
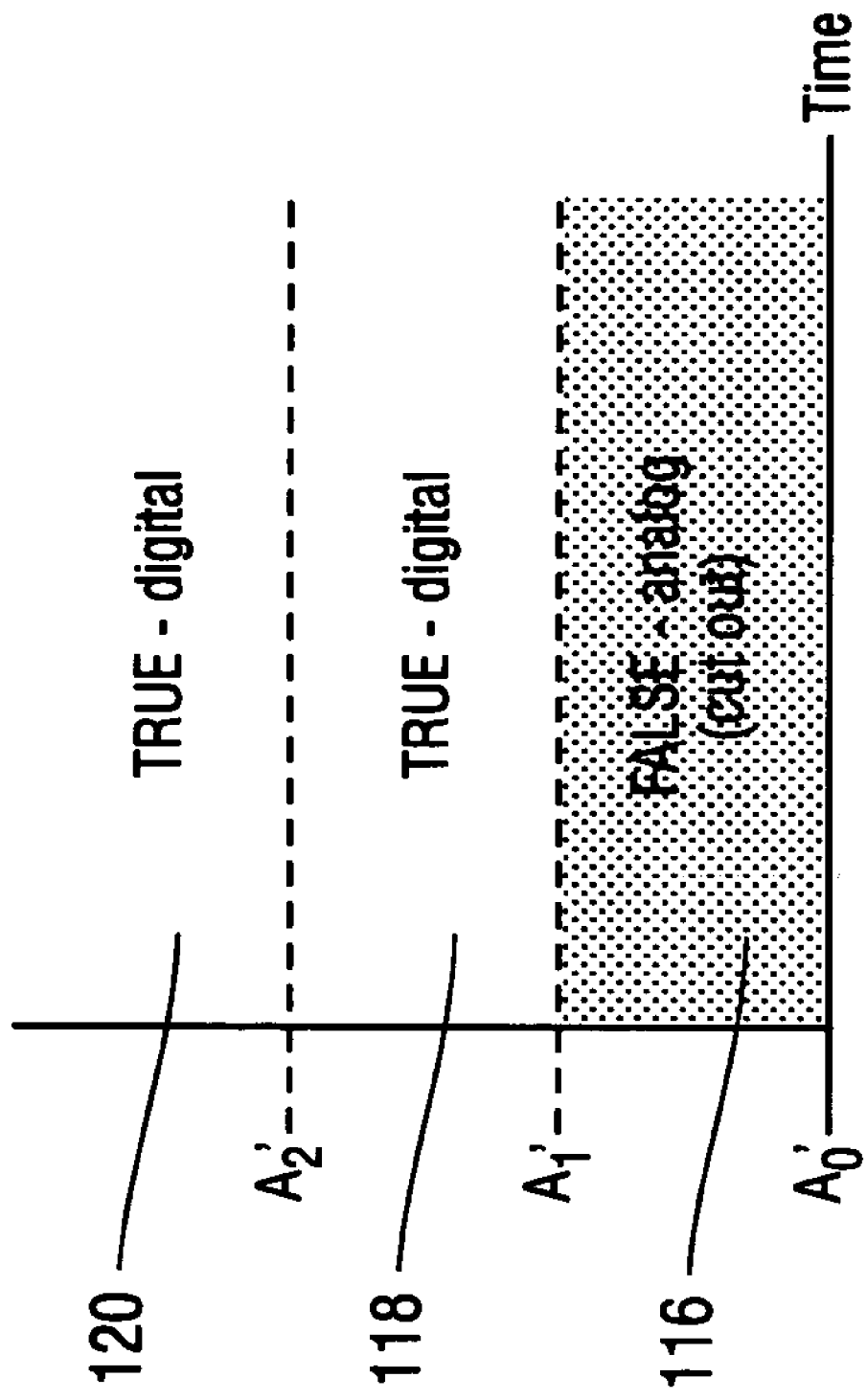
FIG. 9 is a bandwidth chart for the active high pass filter of FIG. 8.

As best understood by comparing FIGS. 5 and 8 with the bandwidth chart in FIG. 9 of the high pass filter 110, the high pass filter 110 is designed to produce a positive voltage (TRUE) condition so long as signals received by the input signal line 62c are digital, digital signals being restricted to amplitudes having magnitudes above the level of ±20 dB ($A_1'$). A cut out (FALSE) condition exists when analog signals are received, analog signals being restricted to amplitudes having magnitudes below the level of ±20 dB ($A_1'$). The high pass filter 110 includes output resistors R7 and R7 to remove background noise and to prevent transient currents from affecting the voltage conditions at the voltage output 114 and throughout the circuitry of the high pass filter 110. The voltage conditions at the voltage output 114 provide the signal type detection logic of the logic control system f.

Consider a signal received by the input signal line 62c having an amplitude of 0 to ±20 dB ($A_1'$), reflected in the low band 116 of FIG. 9. The signal results in a corresponding signal voltage $V_{in}$, proportional to the magnitude of the signal amplitude, at the voltage input 112. The low signal voltage is normally insufficient for the signal to pass from the initial capacitor C3 through the high band resistor R5 or for the signal to overcome the line resistance between the secondary capacitor C4 and filter amplifier 104'. The low band resistor R6 further restricts the low voltage signal. As a result, no signal can reach the signal output 114 leaving an absence of voltage or "cut out" (FALSE) voltage condition at the voltage output 114. This provides the logic signal of the logic control system f indicating that an analog signal is present at the input signal line 62c.

Next consider a signal received by the input signal line 62c having an amplitude of between ±20 dB ($A_1$) and ±60 dB ($A_2$), reflected in the middle band 118 of FIG. 9. The signal results in a corresponding proportional signal voltage $V_{in}$ at the voltage input 112, normally insufficient for the signal to pass from the initial capacitor C3 through the high band resistor R5 but sufficient for to overcome the line resistance between the secondary capacitor C4 and filter amplifier 104'. The filter amplifier 104' can be identical to the filter amplifier 104 of FIG. 6 and is capable of amplifying the signal, which is received at the positive input 109' of the amplifier 104', to produce a positive voltage (TRUE) condition at the voltage output 114. This provides the logic signal of the logic control system f indicating that a digital signal is present at the input signal line 62c.

Now consider a signal received by the input signal line 62c having an amplitude that is greater than the magnitude of ±60 dB ($A_2'$), reflected in the high band 120 of FIG. 9. The signal results in a corresponding proportional signal voltage $V_{in}$ at the voltage input 112 that is normally sufficient for the signal to pass from the initial capacitor C4 through the high band resistor R5, bypassing the secondary capacitor C4 and filter amplifier 104', to create a positive voltage (TRUE) condition at the voltage output 114 without requiring signal amplification. This provides the logic signal of the logic control system f indicating that a digital signal is present at the input signal line 62c.

Figure 10:
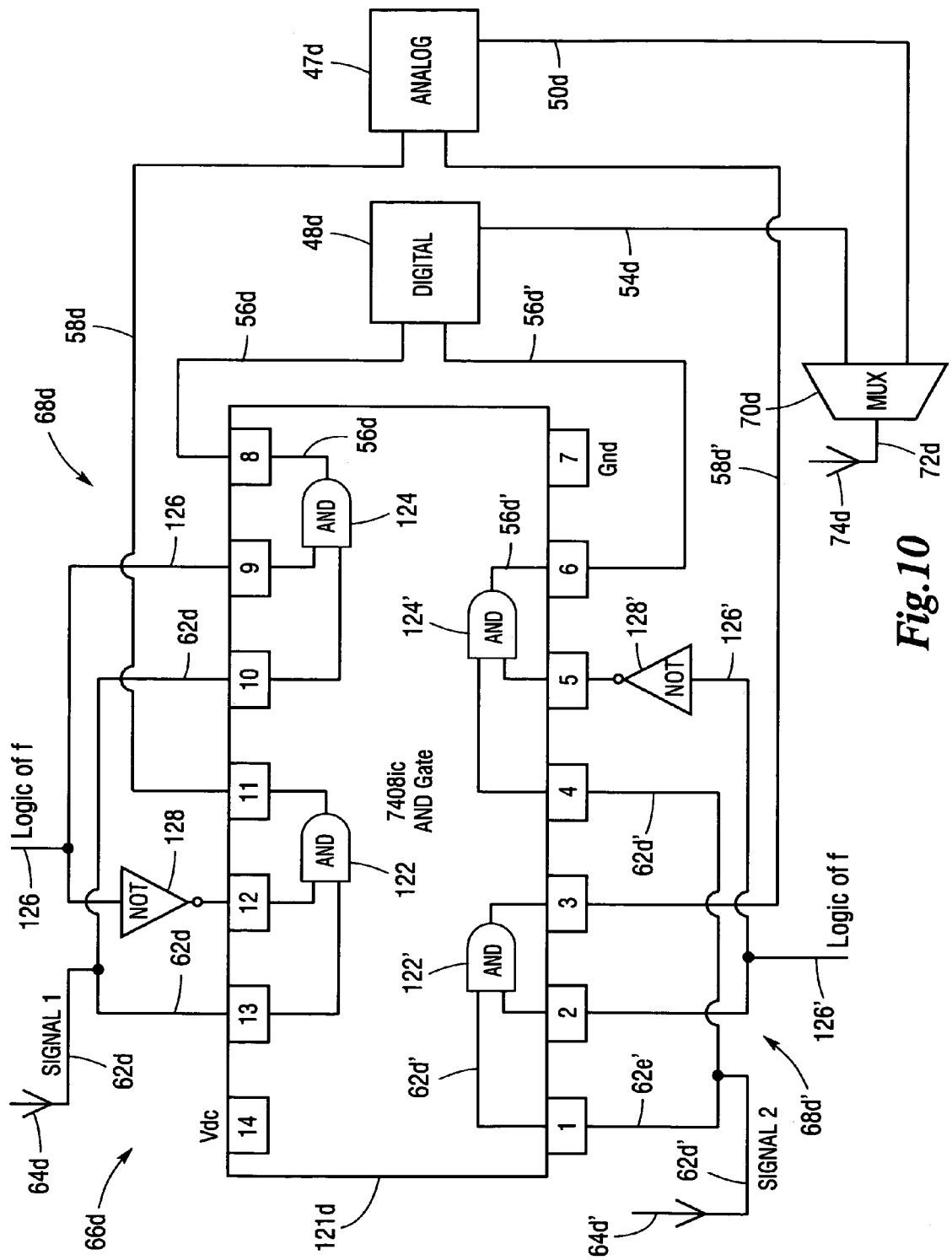
FIG. 10 is an electronic diagram of solid state switching controllable by the logic control system according to one embodiment of the invention.

FIG. 10 depicts how the conditions of the voltage output 100 of the narrow bandwidth bypass filter 96 of FIG. 6 or the voltage output 114 of the active high pass filter 110 of FIG. 8 could be used to provide the logic of the logic control system f for operating and controlling the switching operation of a first switch element 66d. The first switch element 66d includes a solid state, single pole double throw first switch 68d that provides the equivalent switching operation of the depicted mechanical switch 68c of the switch element 66c depicted in FIG. 5.

Referring to FIG. 10, a first input line 126d provides logic of the logic control system f by transferring voltage output conditions from a filter to the first switch element 66d. The single pole double throw first switch 68d is integrated on a 7408ic AND Gate chip 121d, the AND Gate chip 121d being of a type well known by those skilled in the art and being available from manufacturers such as Maxim Integrated Products, Texas Instruments, Motorola, and Philips. The first switch 68d includes two throws which are a first analog interface gate 122 and a first digital interface gate 124, both throws being AND gates. The first input signal line 62d of the switching arrangement forms the single pole of the first switch 68d and is connected to both the first analog interface gate 122 and first digital interface gate 124. The output of the first analog interface gate 122 is connected to the first analog input line 58d leading to the analog interface 47d. The output of the first digital interface gate 124 is connected to the first digital input line 56d leading to the digital interface 48d. The logic line 126d is also connected directly to the first digital interface gate 124 and connected through a first NOT gate 128 to the first analog interface gate 122.

Consider a filter, such as the narrow bandwidth bypass filter 96 of FIG. 6 or the active high pass filter 110 of FIG. 8, when the filter is used to provide the first switch element 66d with the logic signal of the logic control system f Consider further that it is understood that the filter providing the logic of the logic control system f will produce a positive voltage (TRUE) condition if a digital signal is received by the first input signal line 62d and produce an absence of voltage or "cut out" (FALSE) voltage condition if an analog signal is received by the first input signal line 62d. When either type of signal is received by the first input signal line 62d, the signal provides a positive voltage (TRUE) to both the first analog interface gate 122 and first digital interface gate 124.

When the first input signal line 62d receives a digital signal for signal 1, the filter produces a positive voltage (TRUE) condition which is present in the first logic line 126d, while the signal itself passes through the first input signal line 64d to both the first digital interface gate 124 and the first analog interface gate 122 to create first positive voltage (TRUE) condition for each gate. Since the first logic line 126d is connected directly to the first digital interface gate 124, and since the first digital interface gate 124 is an AND gate, the condition of the first logic line 126d becomes the second positive voltage (TRUE) condition received by the first digital interface gate 124, causing the received signal to pass from the first input signal line 64d through the first digital interface gate 124 to the first digital input line 56d and digital interface 48d. However, since the first logic line 126d is connected to the first analog interface gate 124 through the first NOT gate 128, and since the first analog interface gate 122 is also an AND gate, the condition of the first logic line 126d is received as an absence of voltage (FALSE) condition by the first analog interface gate 122 which accordingly prevents the received signal to pass from the first input signal line 64d to the first analog input line 58d and analog interface 47d. The solid state switch 68d thus assumes a condition that is equivalent to position B of the mechanical switch 66c depicted in FIG. 5.

When the first input signal line 62d receives an analog signal for signal 1, the filter produces an absence of voltage (FALSE) condition which is present in the first logic line 126d, while the signal itself is passed through the first input signal line 64d to both the first digital interface gate 124 and the first analog interface gate 122 to create a first positive voltage (TRUE) condition for each gate. Since the logic line 126d is connected directly to the first digital interface gate 124, and since the first digital interface gate 124 is an AND gate, the condition of the first logic line 126d becomes an absence of voltage (FALSE) condition received by the first digital interface gate 124, which accordingly prevents the received signal from passing from the first input signal line 64d through the first digital interface gate 124 to the first digital input line 56d and digital interface 48d. However, since the first logic line 126d is connected to the first analog interface gate 124 through the first NOT gate 128, and since the first analog interface gate 122 is also an AND gate, the condition of the first logic line 126d is received as a positive voltage (TRUE) condition by the first analog interface gate 122, causing the received signal to pass from the first input signal line 64d through the first analog interface gate 122 to the first analog input line 58d and analog interface 47d. The solid state switch 68d thus assumes a condition that is equivalent to position A of the mechanical switch 66c depicted in FIG. 5.

Figure 12:
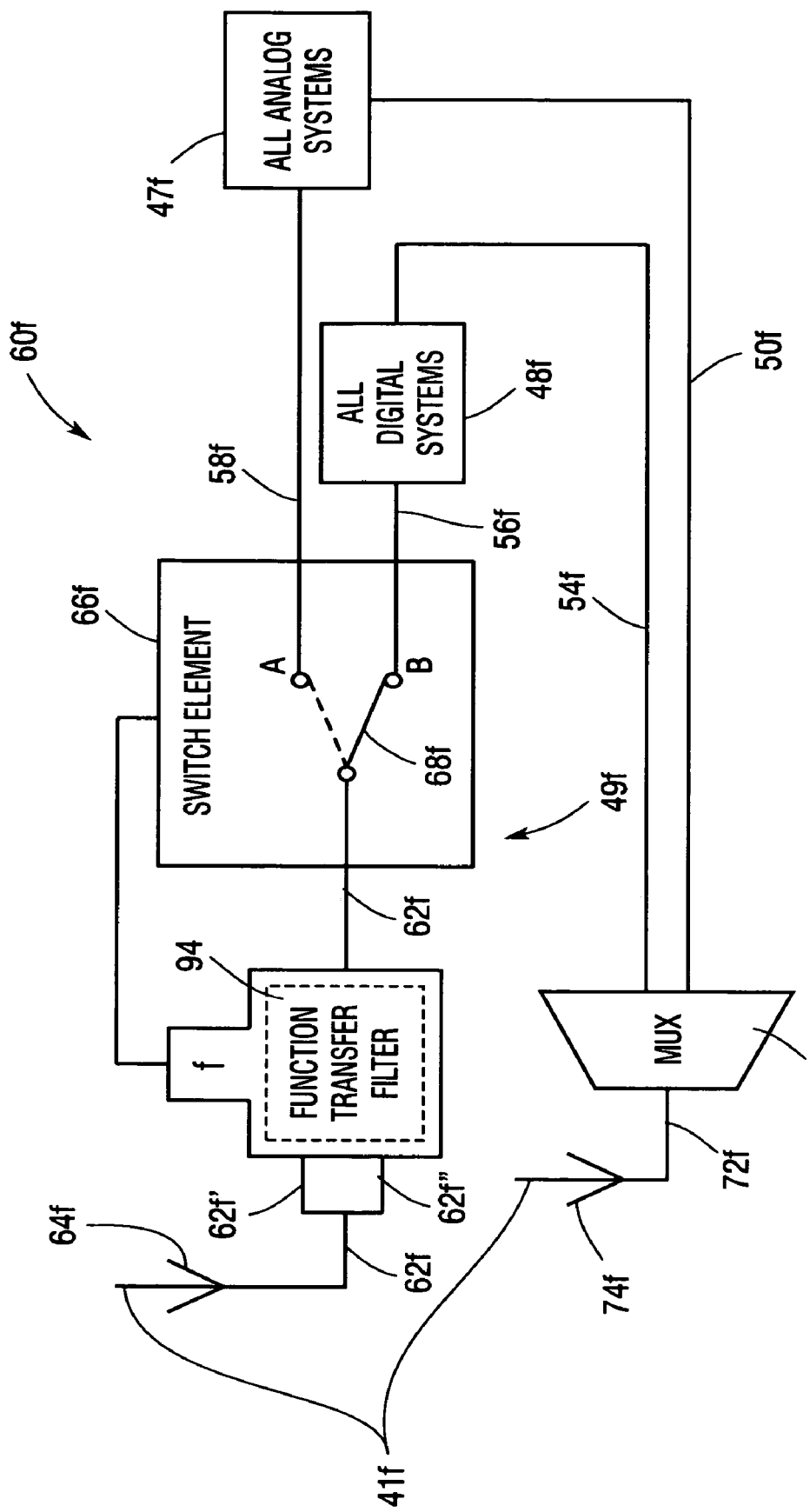
FIG. 12 is a switching arrangement according to one embodiment of the invention.

It will be appreciated that in some embodiments of the invention, input signal lines may be divided or "split" into separate legs to enable the signal to be simultaneously channeled to or monitored by multiple system components, such as the logic control system f. For example, FIG. 12 depicts a switching arrangement 60f of the invention having an input signal line 62f which is divided into a first incoming leg 62f' and a second incoming leg 62f'' immediately before being passed through the integrated function transfer filter 94 and logic control system f. This separation of the input signal line 62f can be useful for channeling the signal to complex or multiple input filtering systems or for allowing for the monitoring or utilization of the received signal without interfering with the passage of the signal to a switching element or analog or digital interface. One example of a possible application of such signal splitting could include the simultaneous use of a signal received by a switching arrangement of the invention by both filters, such as those depicted in FIGS. 6 and 8, for the production of logic by the logic control system f, and by switches, such as the solid state switch 68*d* depicted in FIG. 10, for the production of a first positive voltage (TRUE) condition, as used by the first analog interface gate 122 and first digital interface gate 124.

Figure 13:
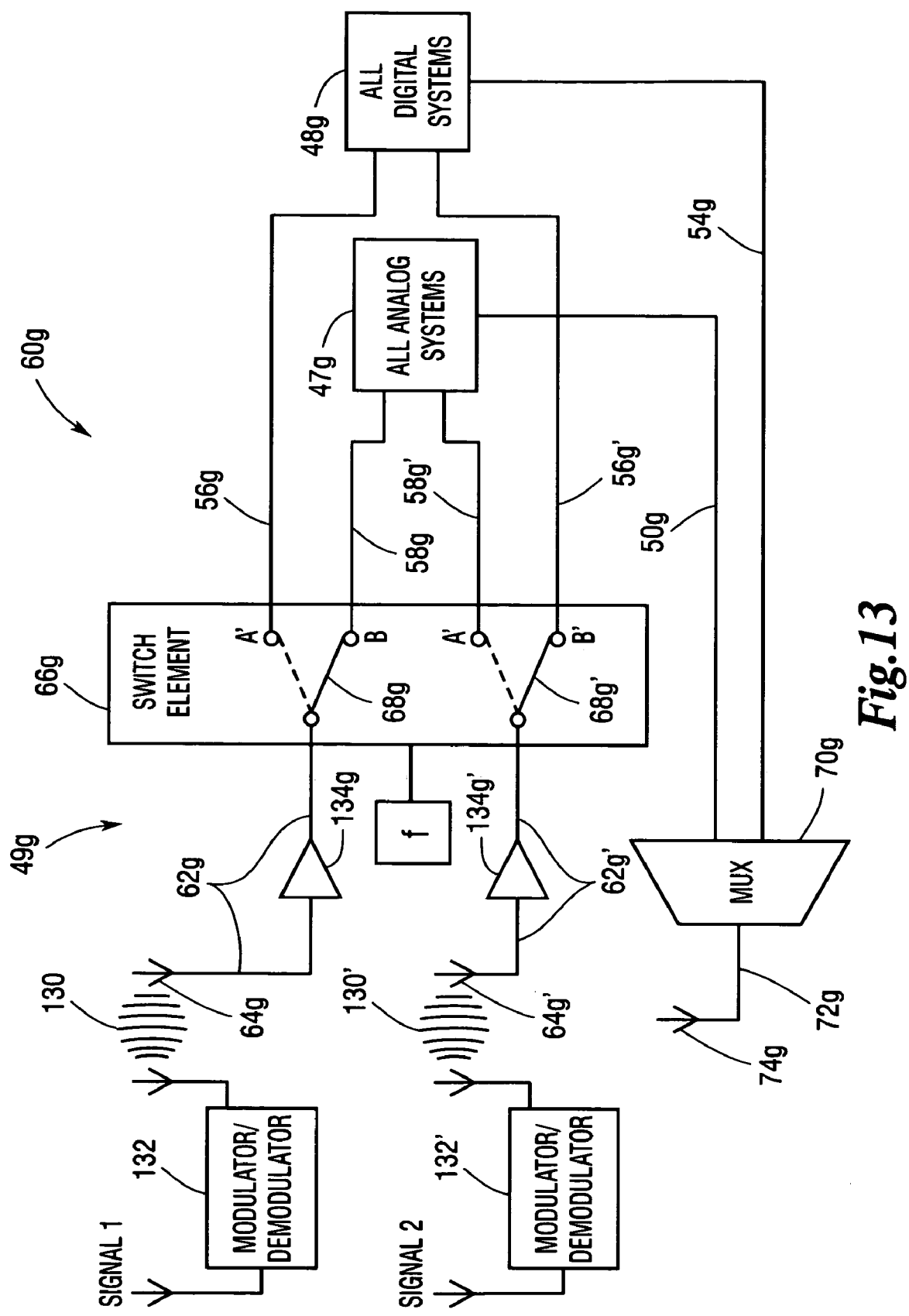
FIG. 13 is a switching arrangement according to one embodiment of the invention.

Frequently, it will be appropriate to implement the invention for simultaneously receiving multiple signals from two or more remote sources using a separate input signal line for each source. Such implementations of the invention can be useful for conducting operations such as three-way calling or other similar operations where it is desirable to simultaneously provide multiple signals to one or more interfaces. FIG. 13 depicts a switching arrangement 60*g* having multiple signal sources 64*g* and 64*g'* for receiving modulated signals 130 and 130' from remote signal transmitting towers 132 and 132'.

Each signal 130 and 130' received in the input signal lines 62*g* and 62*g'* can be amplified with input signal amplifiers 134*g* and 134*g'* to boost each received signal to a level that is compatible with the logic control system f, analog interface 47*g*, and digital interface 48*g*. A dual switch element 66*g* includes separate switches 68*g* and 68*g'* for directing signals received by each input signal line 62*g*. Such dual switch elements are well know in the art, can be mechanical, solid state, or otherwise configured, and can include devices such as the Max 4763, 4764, or 4765 single pole double throw devices available from manufacturers such as Maxim Integrated Products. Both switches 68*g* and 68*g'* are responsive to the logic control system f, which is responsive to both input signal lines 62*g* and 62*g'* and which causes the switch element 66*g* to adjust the positions of both switches 68*g* and 68*g'* according to the detected presence of analog or digital signals in the respective input signal lines 62*g* and 62*g'*. The logic control system f often allows both switches 68*g* and 68*g'* to simultaneously connect the input signal lines 62*g* and 62*g'* to the analog interface 47*g*. However, the logic control system f also often allows only one of the switches 68*g* and 68*g'* to be connected to the digital interface 48*g* at a given time.

Consider a modulated signal 130 (signal 1) that is transmitted from the first remote tower 132 as a digital signal and is received in the first input signal line 62*g*. The signal 130 is amplified and the logic control system f recognizes that the signal 130 is digital. The logic control system f responds by causing the switch element 66*g* to move the first switch 68*g* to position A to direct the signal 130 to the digital interface 48*g*. Consider further that a modulated signal 130' (signal 2) is simultaneously transmitted from the second remote tower 132' as an analog signal and is received in the second input signal line 62*g'*. The signal 130' is amplified and the logic control system f recognizes that the signal 130' is analog. The logic control system f responds by causing the switch element 66*g* to move the second switch 68*g'* to position A' to direct the signal 130' to the analog interface 47*g*. Both the analog interface 47*g* and digital interface 48*g* transmit signals via the multiplexer 70*g* and signal output 74*g* via their respective analog output line 50*g* and digital output line 54*g*. Such conditions allow the switching arrangement 60*g* to perform simultaneous operations without requiring high speed switching, such as allowing for simultaneous modem (digital) and conventional telephone (analog) connections of different devices using the respective analog and digital interfaces 47*g* and 48*g*.

Now consider that the second remote tower 132' changes the modulated signal 130' (signal 2) from an analog to a digital format. The logic control system f recognizes that the signal 130' currently present in the second input signal line 62*g'* is digital. However, in most circumstances, the network interface 48*g* cannot normally receive more than one digital signal at a time. As a result, the logic control system f does not normally cause the second switch element 68*g* to move the second switch 68*g'* to position B' to direct the signal 130' to the digital interface 48*g* so long as a digital signal 130 continues to be received by the first input signal line 62*g*. This is necessary as devices of the type normally connected to the digital interface 48*g* often cannot receive more than one digital signal at a time.

Now consider the second remote tower 132' when it continues to transmit the modulated signal 130' (signal 2) in an analog format, the second switch 68*g'* remaining in position A'. Consider further that the first remote tower 132 changes the modulated signal 130 (signal 1) from a digital to an analog format. The logic control system f recognizes that the signal 130 currently present in the first input signal line 62*g* is analog. In most circumstances, the analog interface 47*g* can receive more than one analog signal at a time. As a result, the logic control system f normally causes the first switch element 68*g* to move the first switch 68*g* to position B to direct the signal 130 to the digital interface 48*g*, even though the second switch 68*g'* simultaneously directs the signal 130' being received in the second input signal line 62*g'* to the analog interface 47*g*. This enables the analog interface 47*g* to receive multiple analog signals simultaneously, as is often necessary for operations such as sound mixing and three-way calling.

It is contemplated that many switching arrangements will incorporate alternate configurations to prevent simultaneous directing of received signals to a digital interface while allowing for the simultaneous directing of signals to an analog interface, each such configuration being contemplated to be within the intended scope of the invention. For example, the logic control system f of FIG. 13 may include programming that precludes the possible simultaneous positioning of the first switch 68*g* in position A and second switch 68*g'* in position B'.

Figure 14:
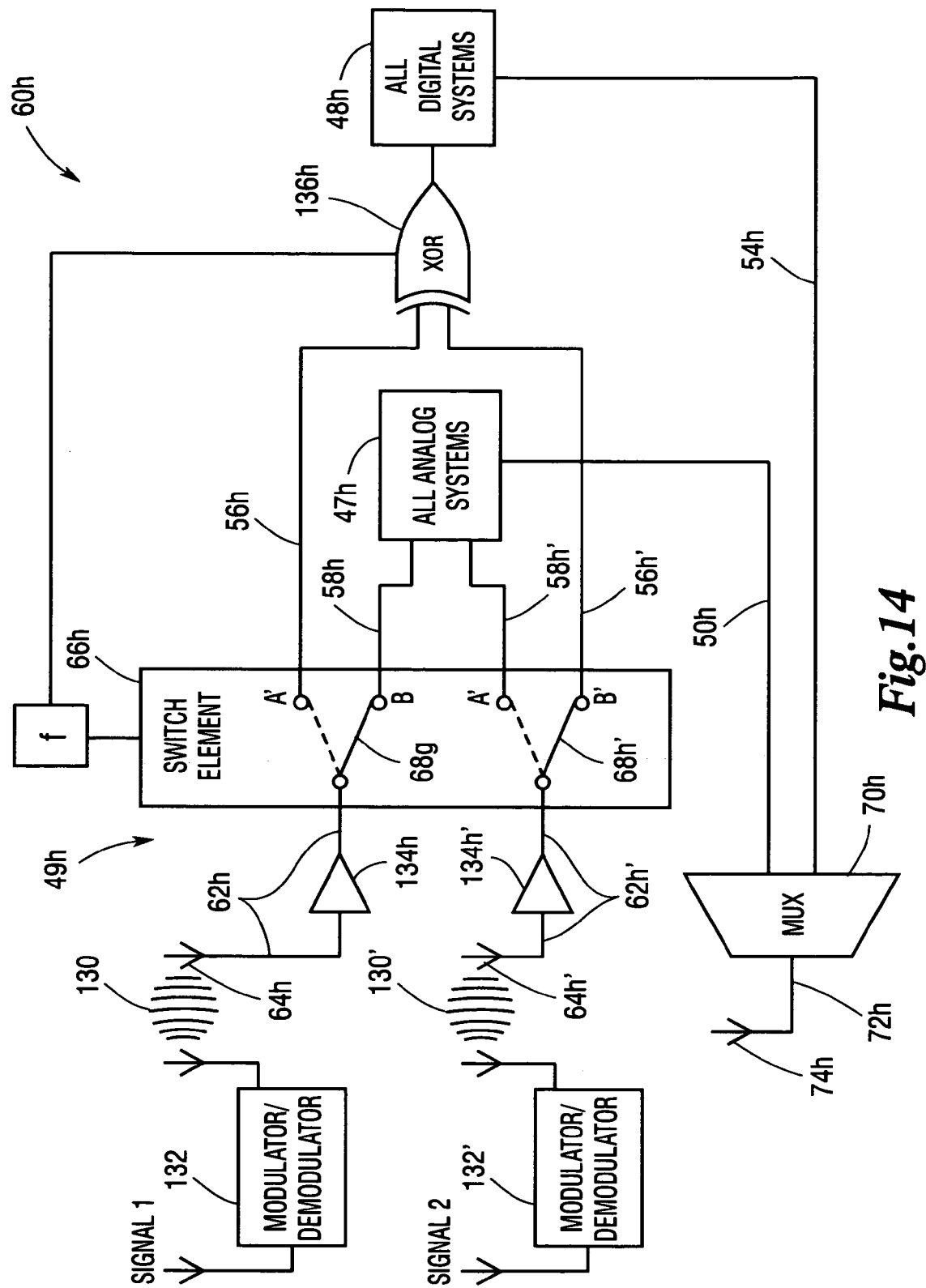
FIG. 14 is a switching arrangement according to one embodiment of the invention.

As another example, FIG. 14 depicts a switching arrangement 60*h* of the invention in which both the first digital input line 56*h* and second digital input line 56*h'* connect to the digital interface 48*h* through an XOR gate 136*h*. The XOR gate 136*h* is responsive to the logic control system f, and when activated, allows either the first digital input line 56*h* or the second digital input line 56*h'*, but not both, to supply a digital signal to the digital interface 48*h*. Consider the situation where both the first switch 68*h* and second switch 68*h'*, based on the detection of signals in both the first input signal line 62*h* and second input signal line 62*h'*, simultaneously direct their signals to the first digital input line 56*h* and second digital input line 56*h'*. The logic control system f responsively activates the XOR gate 136*h*, which, upon simultaneously receiving signals from the first digital input line 56*h* and second digital input line 56*h'*, prevents both signals from reaching the digital interface 48*h* until at least one of the signals is either terminated or diverted away from the XOR gate 136*h* by the first switch 68*h* and/or the second switch 68*h'*.

Figure 15:
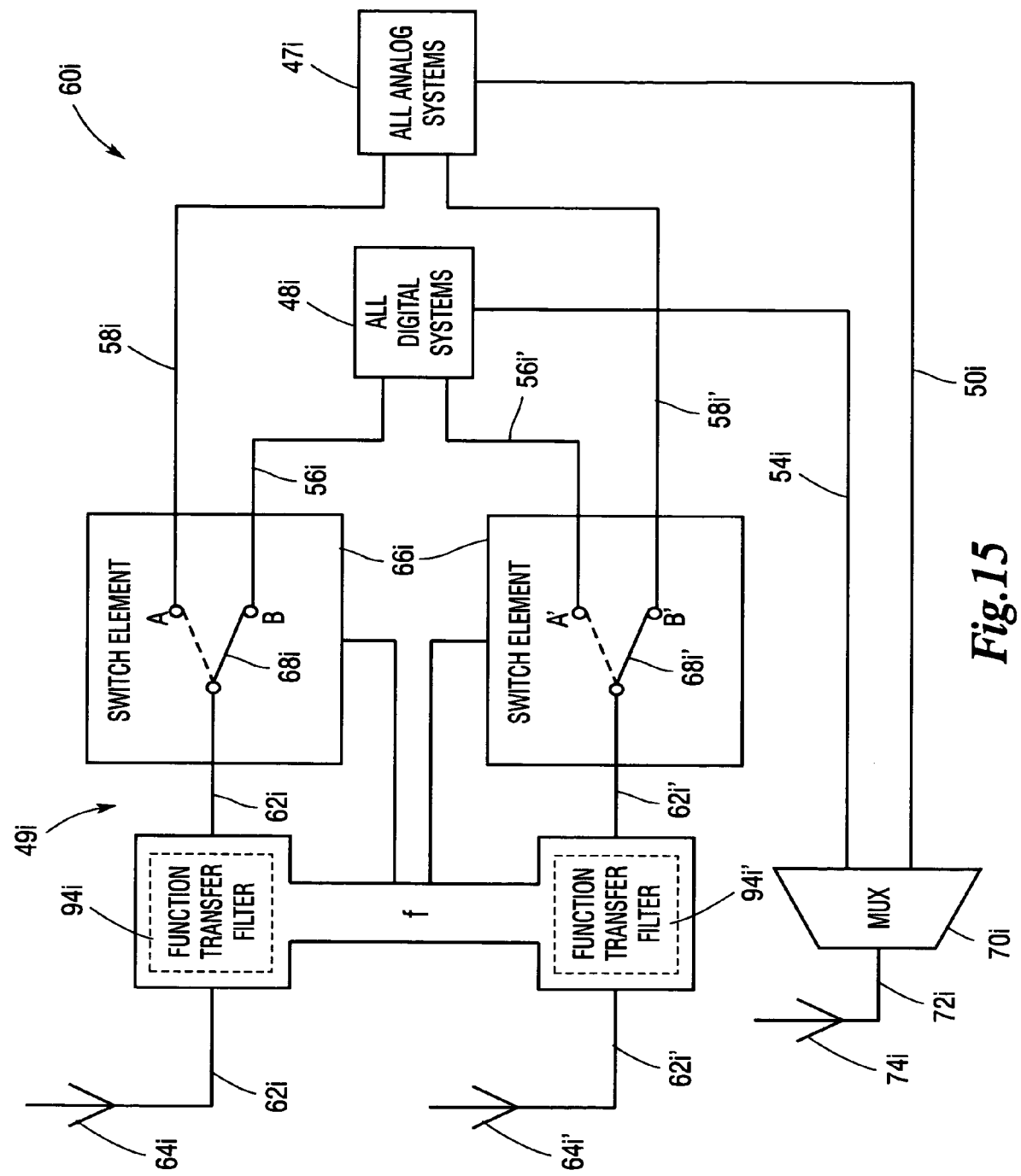
FIG. 15 is a switching arrangement according to one embodiment of the invention.

Now consider the switching arrangement 60*i* of FIG. 15. The arrangement 60*i* includes a first function transfer filter 66*i* and a second function transfer filter 66*i'* integrated into the logic control system f and positioned along the first input signal line 62*i* and second input signal line 62*i'*. The function transfer filters 94*i* and 94*i'* can each be identical to the narrow bandwidth bypass filter 96 of FIG. 6, can be identical to the active high pass filter 110 of FIG. 8, or can be another apparatus suitable for detecting the presence of an analog or digital signal in the first or second input signal lines 62*i* and 62*i'* and providing the logic signal of the logic control system f. The switch element 66*i* can include mechanical switches 66*i* and 66*i'* to direct signals received in the first and second input signal lines 62*i* and 62*i'* to the appropriate analog interface 47*i* or digital interface 48*i*. Alternatively, solid state switches can be used to in place of the first and second mechanical switches 66*i* and 66*i'*, provided the switches used are responsive to the logic control system f.

The 7408*ic* AND Gate chip 121*d*, depicted in FIG. 10, being of a type well known by those skilled in the art and being available from manufacturers such as Maxim Integrated Products, Texas Instruments, Motorola, and Philips, could also be used to provide dual solid state switches equivalent to the mechanical switches 66*i* and 66*i'* depicted in FIG. 15. Referring again to FIG. 10, the switch element 66*d* includes a second single pole double throw switch 68*d'* that is integrated on the AND Gate chip 121*d*, the switch 68*d'* including two throws which are the second analog interface gate 122' and the second digital interface gate 124', both throws being AND gates. The second input signal line 62*d'* of the switching arrangement forms the single pole of the second switch 68*d'* and is connected to both the second analog interface gate 122' and second digital interface gate 124'. The output of the second analog interface gate 122' is connected to the second analog input line 58*d'* leading to the analog interface 47*d*. The output of the second digital interface gate 124' is connected to the second digital input line 56*d'* leading to the digital interface 48*d*. The second logic line 126*d'* is also connected directly to the second digital interface gate 124' and connected through a second NOT gate 128' to the second analog interface gate 122'.

Like the first solid state switch 68*d*, the second solid state switch 68*d'* allows a signal that is present in the second input signal line 62*d'* to pass through the second digital interface gate 124' to the second digital input line 56*d'* to the digital interface 48*d* only when a positive voltage (TRUE) condition is present in the second logic line 126*d'*, simultaneously preventing the signal from passing through the second analog interface gate 122' to the second analog input line 58*d'* and analog interface 47*d*. The second solid state switch 68*d'* allows a signal present in the second input signal line 62*d'* to pass through the second analog interface gate 122' to the second analog input line 58*d'* and then to the analog interface 47*d* only when an absence of voltage (FALSE) condition is present in the second logic line 126*d'*. This also prevents the signal from passing through the second digital interface gate 124' to the second digital input line 58*d'* and digital interface 48*d*.

Figure 11:
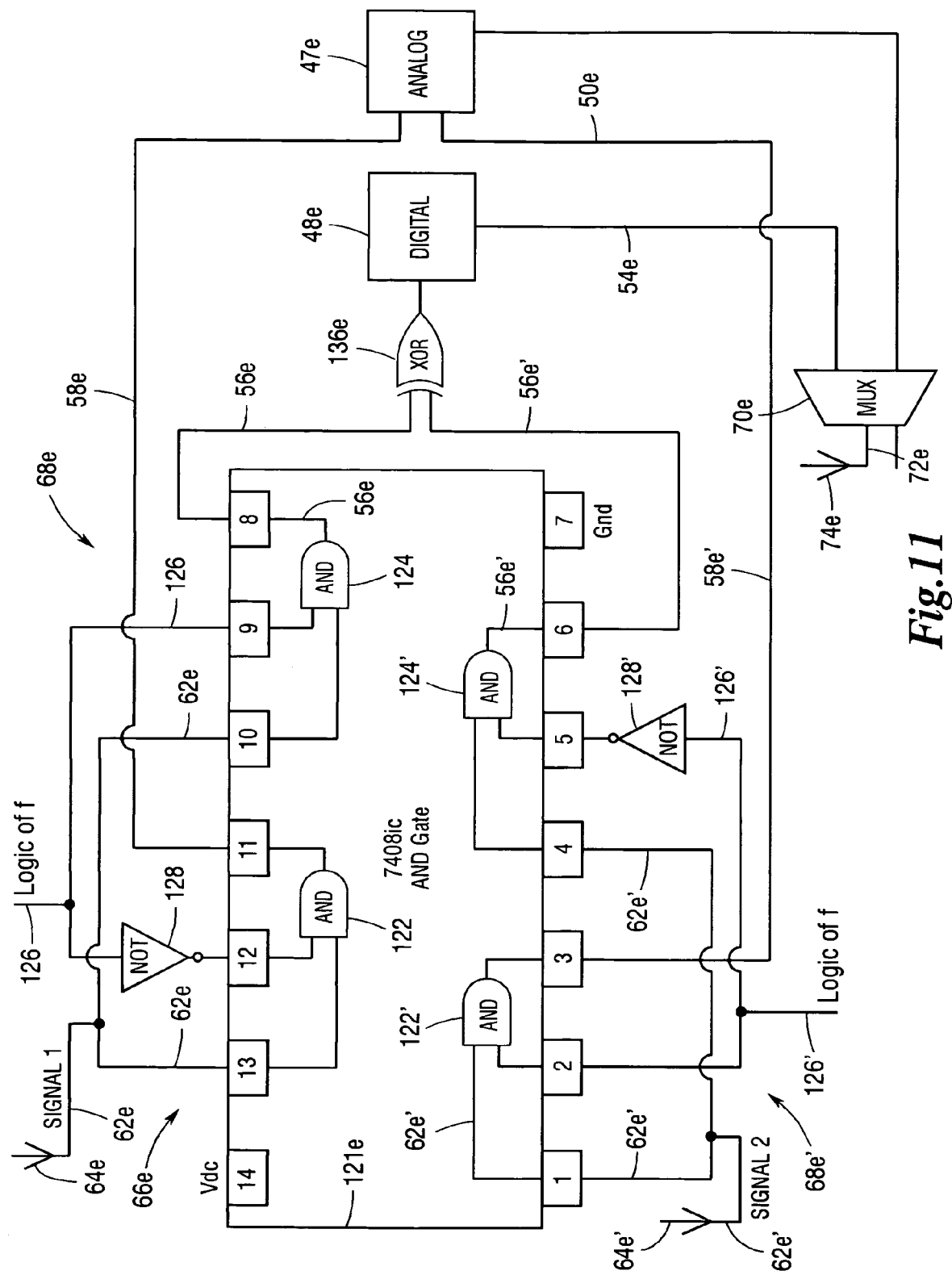
FIG. 11 is an electronic diagram of solid state switching controllable by the logic control system according to one embodiment of the invention.

FIG. 11, like FIG. 10, depicts a 7408*ic* AND gate 121 wherein a first solid state switch 68*e* and a second solid state switch 68*e'* direct two incoming signals to the appropriate analog interface 47*d* or digital interface 48*d* according to the logic of the logic control system f as communicated through first and second logic lines 126*e* and 126*e'*. However, the first digital input line 56*e* and second digital input line 56*e'* are connected to the network interface through an XOR gate 136*e*. In the event that signals become present in both digital input lines 56*e* and 56*e'*, the XOR gate 136*e* prevents either signal from passing to the network interface 48*e*. However, the absence of an XOR gate between the first and second analog interface gates 122 and 122' and analog interface 47*e* allows analog signals to be simultaneously transmitted to the analog interface 47*e* through the first and second analog input lines 58*e*.

Figure 16:
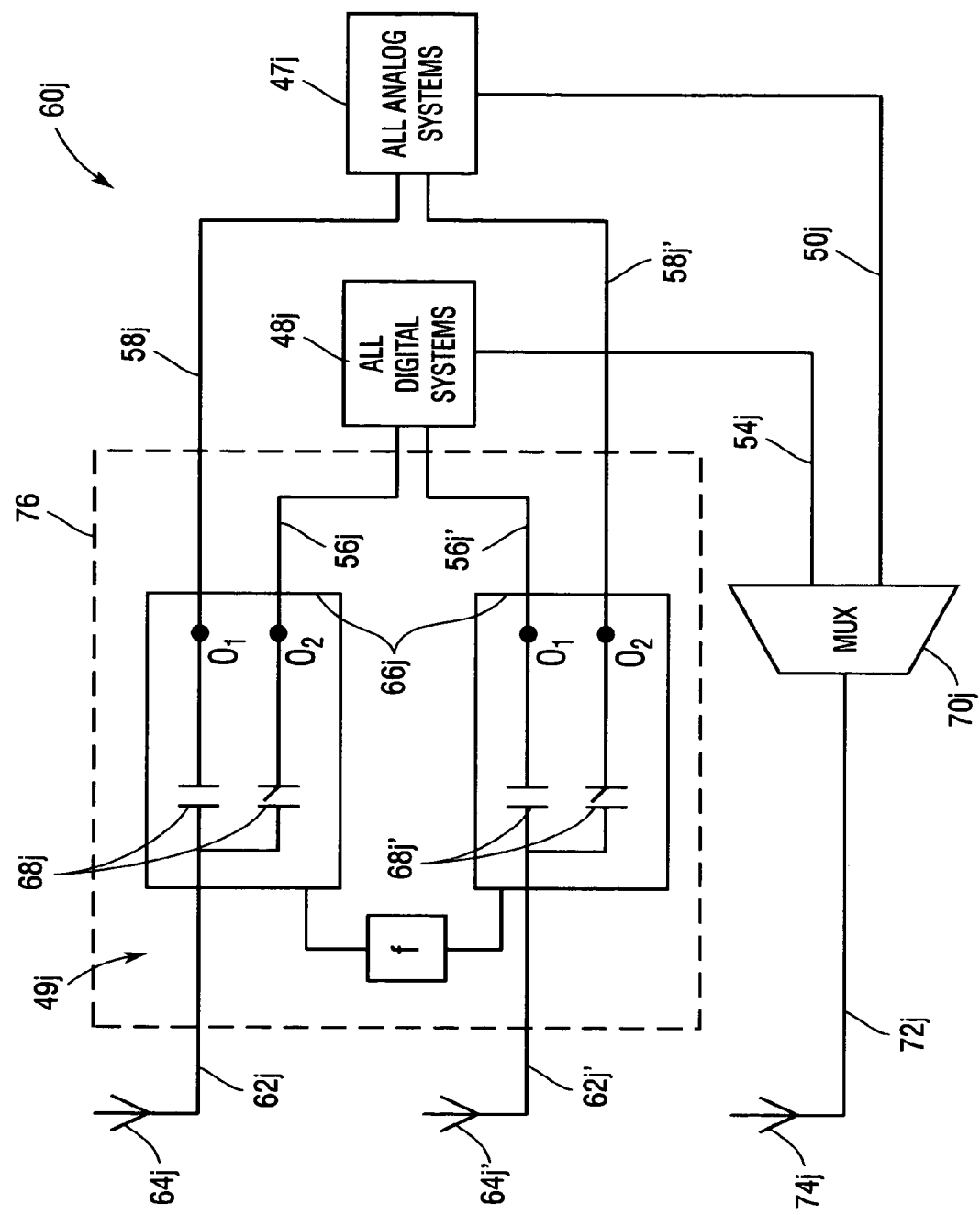
FIG. 16 is a switching arrangement according to one embodiment of the invention.

It will be appreciated that some embodiments of the invention may also utilize software or specific programming techniques to prevent signals from being simultaneously transmitted to a digital interface. FIG. 16 depicts a switching arrangement 60*j* of the invention in which a programmable logic chip (PLC) 76 includes a switching element 66*j* having dual solid state switches 68*j* and 68*j'*, the first solid state switch 68*j* and second solid state switch 68*j'*, like the switch 68*b* of FIG. 3, being integrated into a custom constructed and/or programmed PLC device such as the Max II CPLD obtainable from manufacturers such as the Altera Corporation of San Jose, Calif. The PLC 76 uses Relay Ladder Logic (RLL) language to control switching logic and the operation of the solid state switches 68*j* and 68*j'*.

Consider the switching arrangement 60*j* of FIG. 16 when a digital signal is present in the first input signal line 62*j* and an analog signal is present in the second input signal line 62*j'*. The logic control system f accordingly causes the switch element 66*j* to use the first solid state switch 68*j* to direct the digital signal in the first input signal line 62*j* to the digital interface 48*j* and use the second solid state switch 68*j'* to direct the analog signal in the second input signal line 62*j'* to the analog interface 48*j'*.

If the signal in the first input signal line 62*j* remains digital while the signal in the second input signal line 62*j'* changes from analog to digital, the RLL programming prevents the second solid state switch 68*j'* from directing the signal in the second input signal line 62*j'* to the digital interface 48*j* until the signal in the first input signal line 62*j* either terminates or changes to analog and is redirected to the analog interface 47*j*. If the signal in the first input signal line 62*j* changes from digital to analog while the signal in the second input signal line 62*j'* remains analog, the RLL programming recognizes that two analog signals can be simultaneously directed to the analog interface 47*j*, and allows the first solid state switch 68*j* to direct the signal in the first input signal line 62*j* to the analog interface 47*j*, even though the signal in the second input signal line 62*j'* is also being directed to the analog interface 47*j*.

Although the switching arrangement 60*j* of FIG. 16 is shown and described with a single PLC 76 having multiple switches 68*j*, it will be appreciated that multiple PLCs can also be implemented to effect switching according to the instructions of the logic control system f as long as the RLL programming of each PLC prevents simultaneous transmission of two or more signals to a digital interface while allowing for simultaneous transmission of multiple signals to an analog interface.

Figure 17:
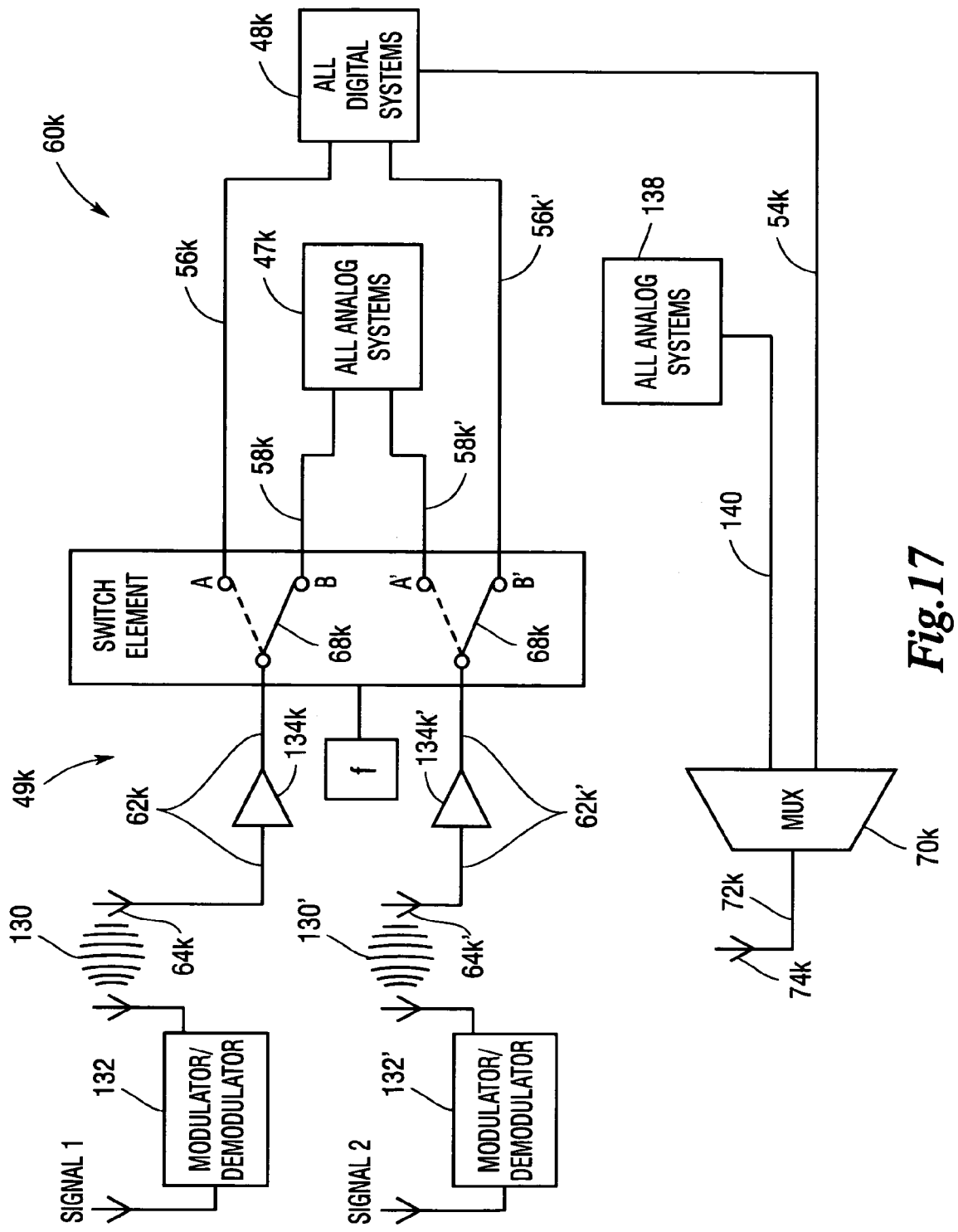
FIG. 17 is a switching arrangement according to one embodiment of the invention.

In some embodiments of the invention, analog transmissions from the switching arrangement may be transmitted by a separate interface than the interface through which signals are received from one or more input signal lines. For example, FIG. 17 depicts a switching arrangement 60*k* of the invention having a separate audio input interface 138 through which certain audio input devices, such as a microphone or other analog input device, can be connected to the switching arrangement 60*k* independent of the analog interface 47*k*. Output of the audio input interface 138 is channeled to the multiplexer 70*k* via an audio output line 140 for transmission via the signal output line 72*k* and signal output 74*k*.

In some applications, such an arrangement may be appropriately implemented where a user receives analog signals and responds to the received signals by independently producing separate analog transmissions. For example, as best understood by comparing FIG. 17 to FIG. 1, a user of the platform 40 may receive analog signals from the audio interface 47a, heard by the user as voice sounds through a speaker of the cellular telephone 46 connected to the audio interface 47a. The user can then transmit analog signals by speaking into a microphone of the cellular telephone 46 connected to the audio input interface 138. The audio output line 140 then channels the analog signals directly to the transceiver via the multiplexer 70k, signal output line 72k, and signal output 74k.

Figure 18:
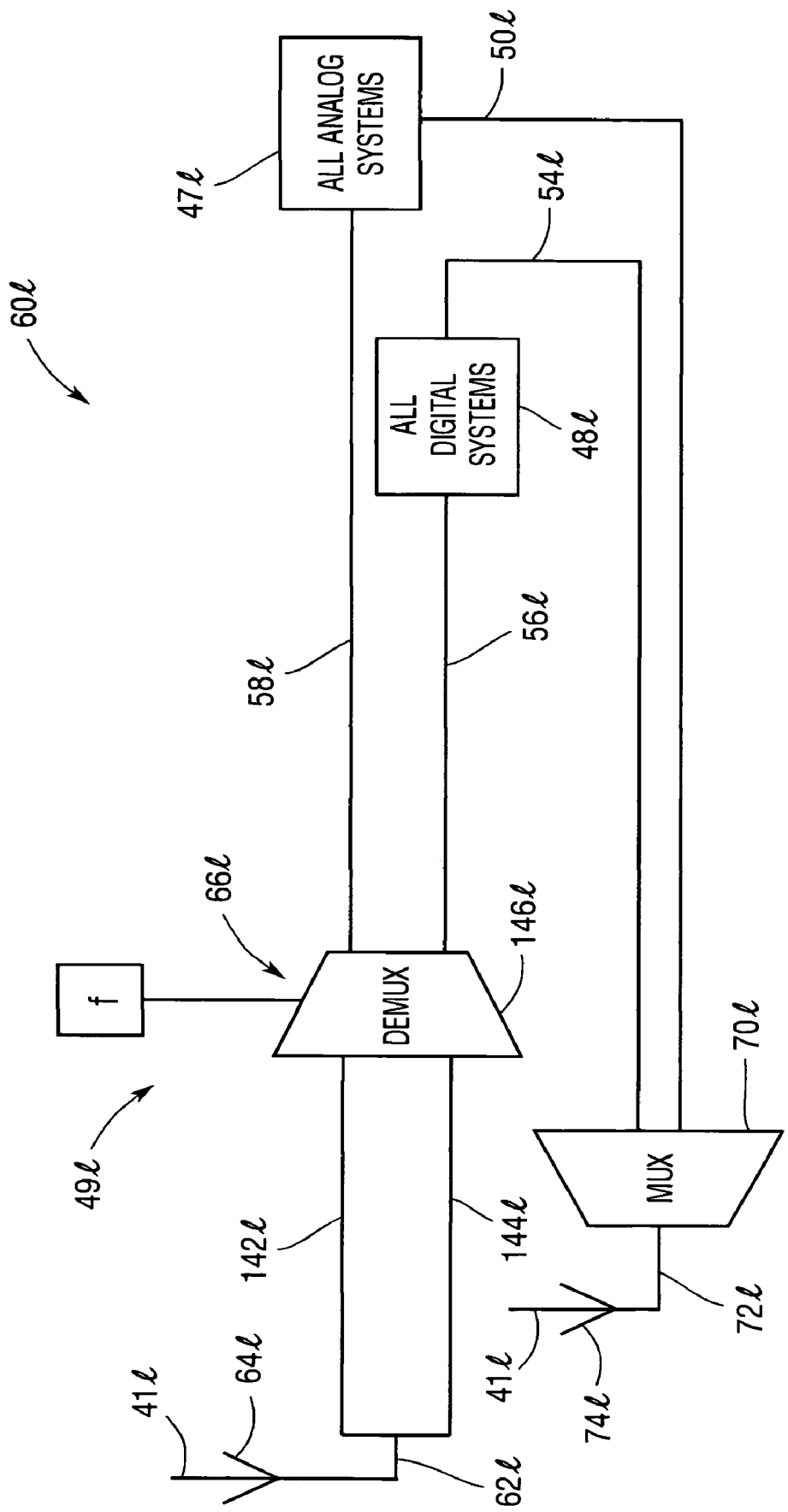
FIG. 18 is a switching arrangement according to one embodiment of the invention.

FIG. 18 depicts a switching arrangement 60l of the invention in which the input signal line 62l, forming the single pole of the switch of the switch element 66l, splits into a separate analog switch line 142l and digital switch line 144l, which separately lead to a demultiplexer 146l. The demultiplexer 146l is of the type, well known by those skilled in the art, that allows the analog switch line 142l to connect, via a first AND gate (not shown) that is located within the demultiplexer 146l, to the analog input line 58l. The demultiplexer 146l also allows the digital switch line 144l to connect, via a second AND gate (not shown) that is also located within the demultiplexer 146l, to the digital input line 56l. Suitable demultiplexers include the 74LVC1G18 and 74LVC1G19 demultiplexer units available from manufacturers such as Philips, Texas Instruments, and Motorla.

Both AND gates within the demultiplexer 66l are responsive to the logic control system f, which supplies a positive voltage (TRUE) signal to either the first AND gate, connecting the analog switch line 142l and analog input line 58l, or to the second AND gate, connecting the digital switch line 144l and digital input line 56l, depending on the type of signal that is detected in the input signal line 62l. The first and second AND gates of the demultiplexer 66l form the two poles of the solid state switch of the switch element 66l which effect switching logic controlled by the logic control system f.

When a signal, whether analog or digital, is received by the input signal line 62l, the signal splits to be present in both the analog and digital switch lines 142l and 144l. The received signal provides the first positive voltage (TRUE) condition for the first and second AND gates within the demultiplexer 66l. The logic control system f can utilize a signal transfer filter, software programming, or another logic or signal recognition apparatus and method to detect the type of signal present and produce a second positive voltage (TRUE) logic signal to the demultiplexer 66l accordingly. If the logic control system f detects the presence of an analog signal (received signal) in the input signal line 62l, it will transmit a positive voltage (TRUE) logic signal only to the first AND gate connecting the analog switch line 142l and analog input line 58l. The logic signal will become the second positive condition for the first AND gate, allowing the received signal to pass through the demultiplexer 66l only to the analog interface 47l. If the logic control system f detects the presence of a digital signal (received signal) in the input signal line 62l, it transmits a positive voltage (TRUE) logic signal only to the second AND gate connecting the digital switch line 144l and digital input line 56l. The logic signal becomes the second positive condition for the second AND gate, allowing the received signal to pass through the demultiplexer 66l only to the digital interface 47l.

Figure 19:
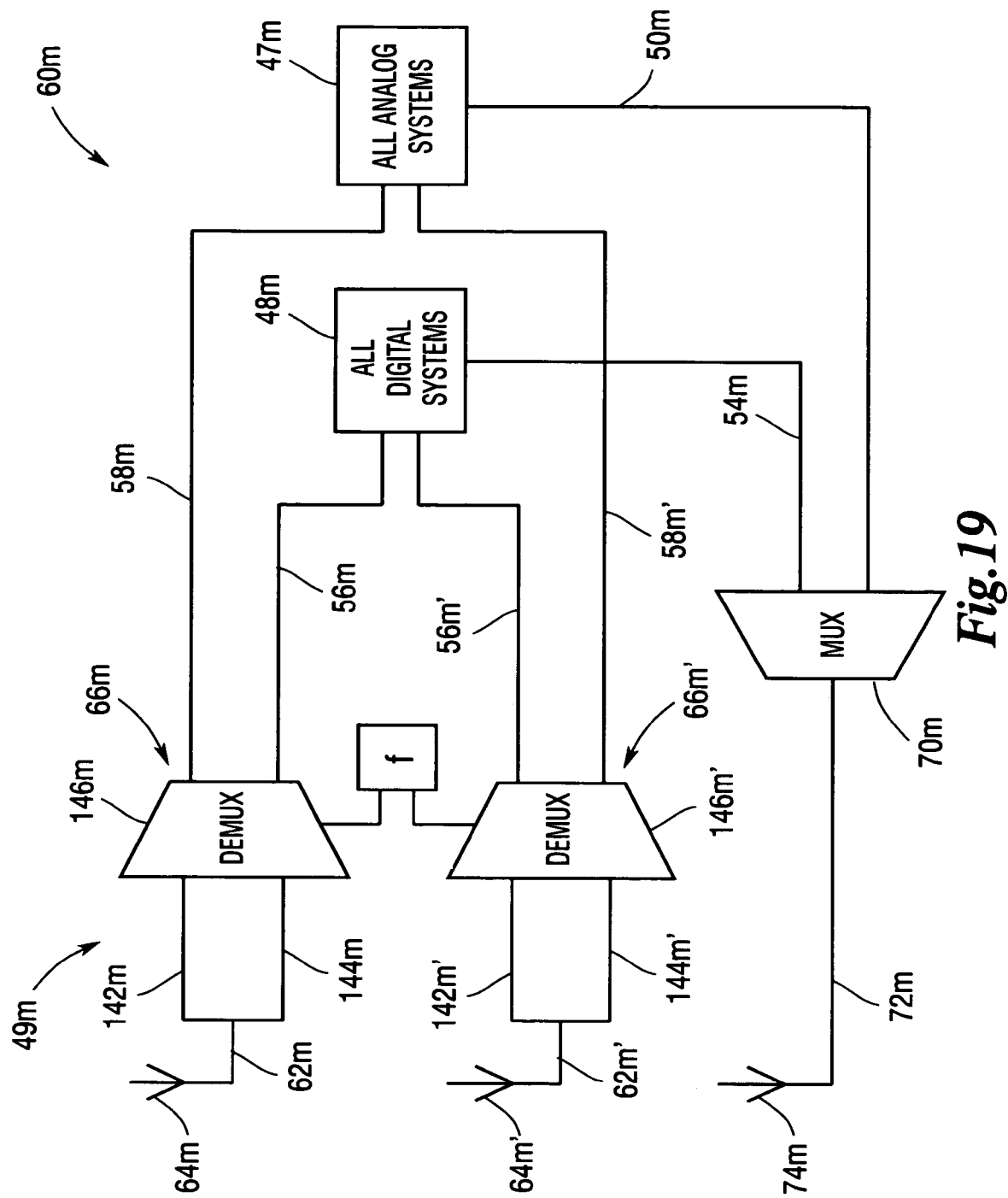
FIG. 19 is a switching arrangement according to one embodiment of the invention.

FIG. 19 depicts a switching arrangement 60m of the invention having dual demultiplexers 146m and 146m' that restrict signals received by first and second input signal lines 62m and 62m' and which both have switch elements 66m' with AND gate-based switches controlled by the logic control system f. The logic control system f is responsive to whether signals present in both input signal lines 62m and 62m' are analog or digital and directs signals in both lines to the appropriate analog or digital interface 47m or 48m depending on the type of received signal that is detected in each line. The logic control system f can be programmed or otherwise configured to prevent digital signals received by multiple input signal lines from being simultaneously directed to the digital interface 48m while allowing analog signals received by multiple input signal lines to be simultaneously directed to the analog interface 47m. Alternatively, the first and second digital input lines 56m and 56m' can be connected to the digital interface 48m through a common XOR gate (not shown) to prevent simultaneous signal transmission to the digital interface 48m.

Figure 20:
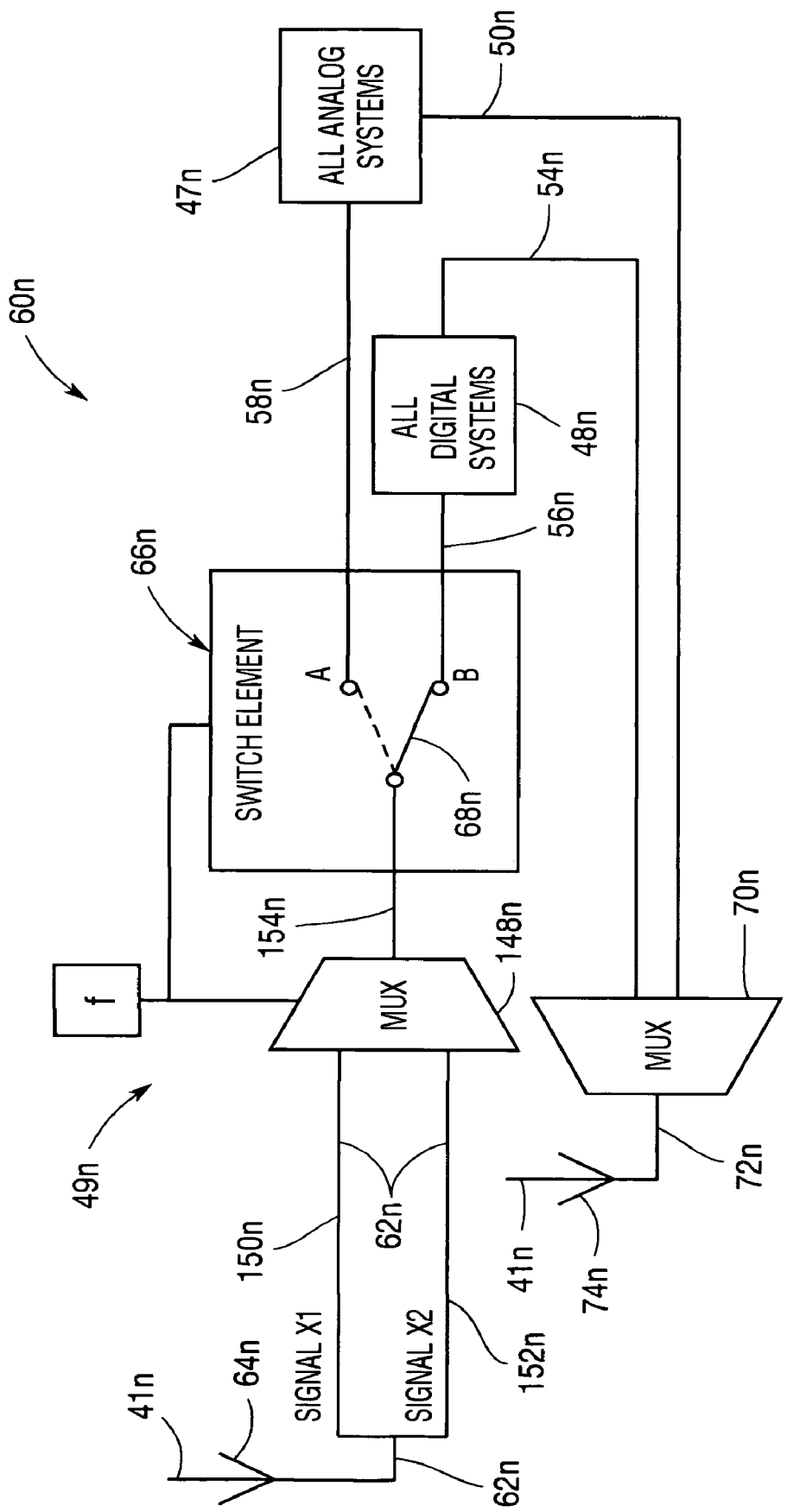
FIG. 20 is a switching arrangement according to one embodiment of the invention.

Some embodiments of the invention allow for the use of a multiplexer to enable a single switch to direct signals received from multiple lines to appropriate interfaces. FIG. 20 depicts a switching arrangement 60n of the invention in which an input signal line 62n is split into separate legs, being divided into an analog multiplexer line 150n and a digital multiplexer line 152n. The analog and digital multiplexer lines 150n and 152n channel the received signal into a multiplexer 148n, which is responsive to the logic control system f The multiplexer 148n is of the type, well known by those skilled in the art, that allows the analog multiplexer line 150n to connect, via a first AND gate (not shown) that is located within the multiplexer 148n, to a switch line 154n. The multiplexer 154n also allows the digital multiplexer line 154n to connect, via a second AND gate (not shown) that is also located within the multiplexer 154n, to the switch line 154n. Suitable multiplexers include the Max 4783 and Max 4784 multiplexer units, both available from Maxim Integrated Products. The switch line 154 connects the multiplexer 148n to the switch 68n of the switch element 66n, the switch being primarily responsible for directing received signals to the appropriate analog or digital interface 47n or 48n via.

When a signal, whether analog or digital, is received by the input signal line 62n, the received signal splits to be present in both the analog multiplexer line 150n and digital multiplexer line 152n. The received signal provides the first positive voltage (TRUE) condition for the first and second AND gates within the multiplexer 148n.

Consider a signal (received signal) received by the input signal line 62n that is digital. The received signal is detected to be a digital signal by the logic control system f, which responsively sends a positive voltage (TRUE) logic signal only to the second AND gate within the multiplexer 148n. Since the logic signal from the logic control system f is the second positive condition received by the second AND gate, the multiplexer 148n assumes a first multiplexer condition and the received signal is permitted to travel from the digital multiplexer line 152n through the multiplexer 148n to the switch 68n of the switch element 66n via the switch line 154n. Since the logic control system f does not send a positive voltage (TRUE) logic signal to the first AND gate when the multiplexer 148n is in the first multiplexer condition, the received signal cannot pass from the analog multiplexer line 150n through the multiplexer 148n to the switch line 154n. The switch 68n, being responsive to the multiplexer 148n and logic control system f, moves to position B to connect the received signal to the digital interface 47n.

Now consider a signal (received signal) received by the input signal line 62n that is analog. The received signal is detected to be an analog signal by the logic control system f, which responsively sends a positive voltage (TRUE) logic signal only to the first AND gate within the multiplexer 148n. Since the logic signal from the logic control system f is the second positive condition received by the first AND gate, the multiplexer 148n assumes a second multiplexer condition and the received signal is permitted to travel from the analog multiplexer line 150*n* through the multiplexer 148*n* to the switch 68*n* of the switch element 66*n* via the switch line 154*n*. Since the logic control system f does not send a positive voltage (TRUE) logic signal to the second AND gate when the multiplexer 148*n* is in the second multiplexer condition, the received signal cannot pass from the digital multiplexer line 152*n* through the multiplexer 148*n* to the switch line 154*n*. The switch 68*n*, being responsive to the multiplexer 148*n* and logic control system f, moves to position A to connect the received signal to the analog interface 47*n*.

Figure 21:
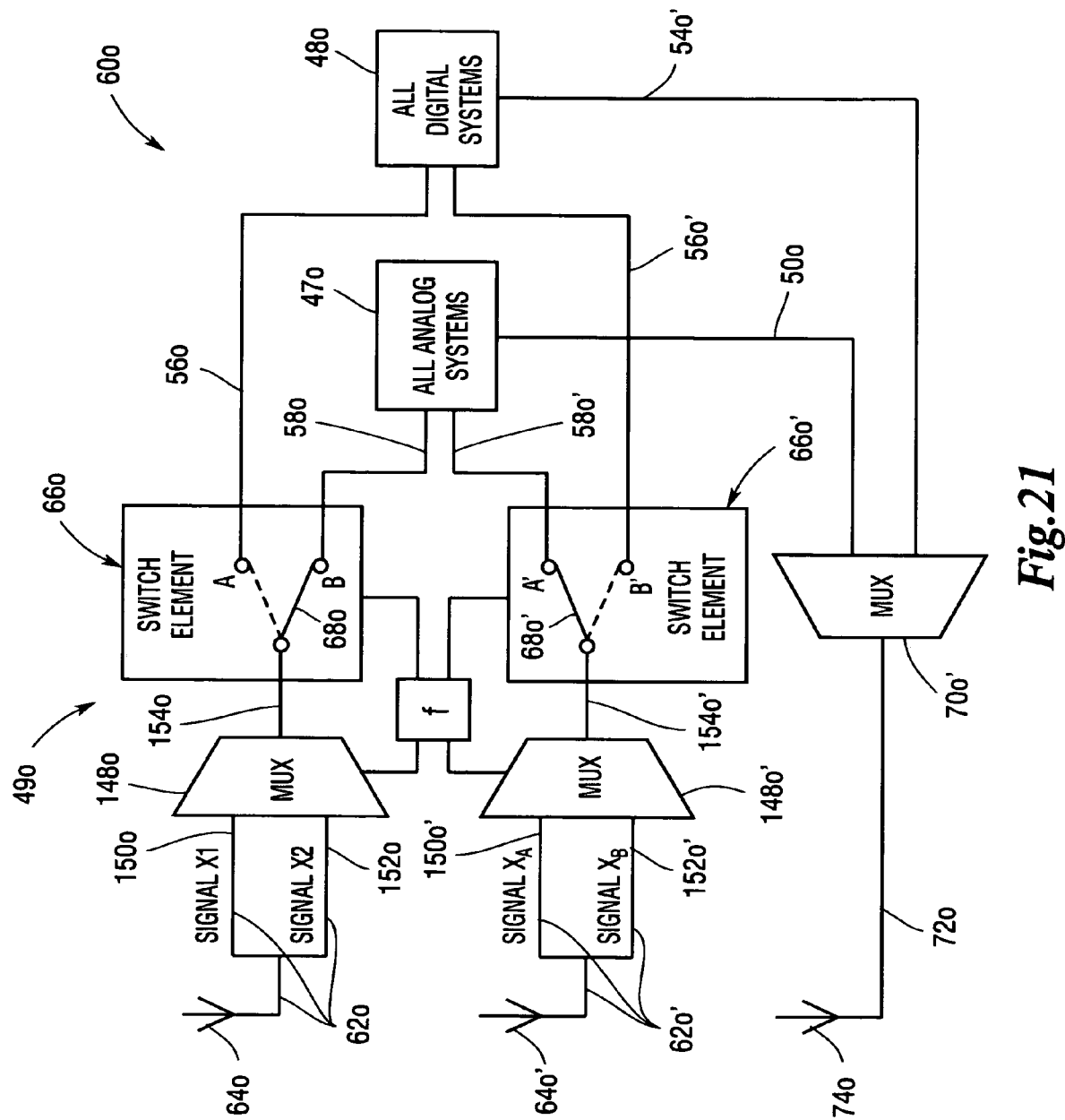
FIG. 21 is a switching arrangement according to one embodiment of the invention.

FIG. 21 depicts a switching arrangement 60*o* of the invention having dual multiplexers 148*o* and 148*o*' that restrict signals received by first and second input signal lines 62*o* and 62*o*' (received signals) with AND gate-based switches controlled by the logic control system f. Each of the first and second input signal lines 62*o*/62*o*' is divided into a separate analog multiplexer line 150*n*/150*n*' and digital multiplexer line 152*n*/152*n*' that connects to a respective multiplexer 148*o*/148*o*'. The logic control system f is responsive to whether received signals present in both input signal lines 62*o* and 62*o*' are analog or digital, and allows each received signal to pass through the multiplexers 148*o* and 148*o*' in the same manner and according to the same logical conditions as the multiplexer 148*m* of FIG. 20. Received signals are then passed from the multiplexers 148*o* and 148*o*' to the switch elements 66*o* and 66*o*' via switch lines 154*o* and 154'. The logic control system f directs the received signals to the appropriate analog or digital interface 47*o* or 48*o* by adjusting the switches 66*o* and 66*o*' accordingly, which are thus responsive to the multiplexer 148*o* and 148*o*'.

The logic control system f can be programmed or otherwise configured to prevent digital signals received by multiple input signal lines from being simultaneously directed to the digital interface 48*o* while allowing analog signals received by multiple input signal lines to be simultaneously directed to the analog interface 47*o*. This may be done by programming the logic control system f so that the switches 66*o* and 66*o*' are not be responsive to the multiplexer 148*o* and 148*o*' when digital signals are received by both first and second input signal lines 62*o* and 62*o*'. Alternatively, the first and second digital input lines 56*o* and 56*o*' can be connected to the digital interface 48*o* through a common XOR gate (not shown) to prevent simultaneous signal transmission to the digital interface 48*o*.

Figure 22:
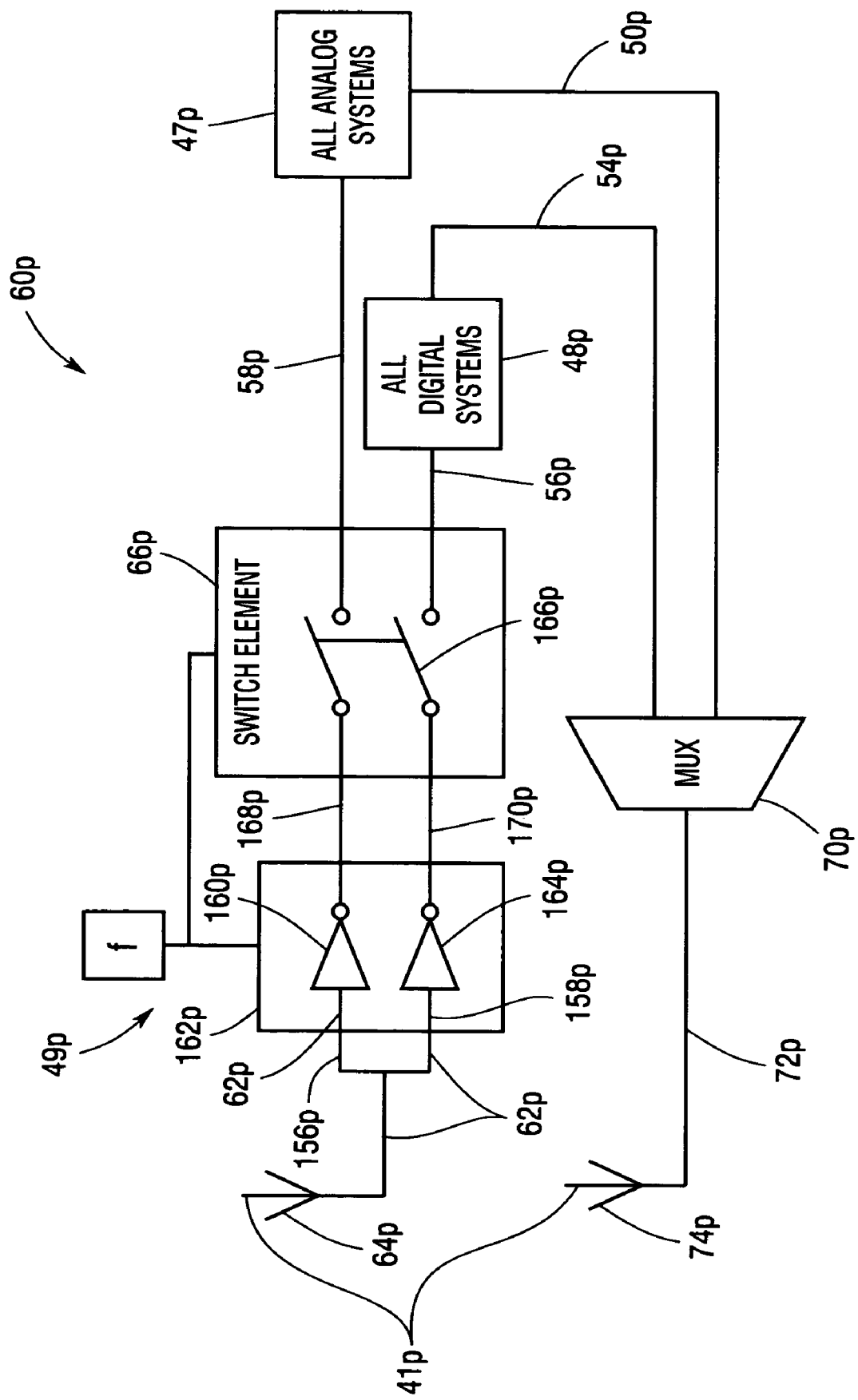
FIG. 22 is a switching arrangement according to one embodiment of the invention.

Although the invention has been shown and described as including switching elements having switches that are at least single pole and double throw, it will be appreciated that gates having a larger number of throws or poles can also be implemented and that switching arrangements having such switching elements are within the intended scope of the invention. For example, FIG. 22 depicts a switching arrangement 60*p* of the invention in which the input signal line 62*p* splits into two legs that include an analog gate line 156*p* and a digital gate line 158*p*. The analog gate line 156*p* leads to a first NOT gate 160*p* and the digital gate line 158*p* leads to second NOT gate 164*p*, both the first NOT gate 160*p* and the second NOT gate 164*p* being integrated into a dual NOT gate control 162*p*. Both the first and second NOT gates 160*p* and 164*p* are responsive to the logic control system f, and connect to a switch element 66*p* having a double pole, double throw switch 166*p* via an analog switch line 168*p* and a digital switch line 170*p*. The dual NOT gate control 162*p* is of a type well known in the art and can be based on a 7408 NOT gate chip available from manufacturers such as Maxim Integrated Products, Texas Instruments, Motorola, and Philips.

Consider the switching arrangement 60*p* when a signal (received signal) received by the input signal line 62*p* is digital. The logic control system f detects that the received signal is digital and responsively creates a positive voltage (TRUE) condition only in the first NOT gate 160*p*, activating the first NOT gate 160*p*. The received digital signal is present in both the analog gate line 156*p* and digital gate line 158*p*, but cannot pass from the analog gate line 156*p* through the first NOT gate 160*p* since, being activated by the logic control system f, the first NOT gate 160*p* produces an absence of voltage (FALSE) logic condition as an output when the received signal reaches the first NOT gate 160*p*. The logic control system f does not activate the second NOT gate 164*p*, allowing the received signal to pass from the digital gate line 158*p* through the second NOT gate 164*p* and to the switch element 66*p* via a digital switch line 170*p*. Detecting the presence of the received signal in the input signal line 62*p*, the logic control system f also connects the digital switch line 170*p* to the digital input line 56*p* with the double pole double throw switch 166*p*. This allows the received signal to pass to the digital interface 48*p*.

Now consider the switching arrangement 60*p* when a signal received by the input signal line 62*p* is analog. The logic control system f detects that the received signal is analog and responsively sends a positive voltage (TRUE) logic signal only in the second NOT gate 164*p*, activating the second NOT gate 164*p*. The received digital signal is present in both the analog gate line 156*p* and digital gate line 158*p*, but cannot pass from the digital gate line 158*p* through the second NOT gate 164*p* since, being activated by the logic control system f, the second NOT gate 164*p* produces an absence of voltage (FALSE) condition as an output when the received signal reaches the second NOT gate 164*p*. The logic control system f does not activate the first NOT gate 160*p*, allowing the received signal to pass from the analog gate line 156*p* through the first NOT gate 160*p* and to the switch element 66*p* via an analog switch line 168*p*. Detecting the presence of the received signal in the input signal line 62*p*, the logic control system f also connects analog switch line 168*p* to the analog input line 58*p* with the double pole double throw switch 166*p*. This allows the received signal to pass to the analog interface 47*p*.

Although the switching arrangement 60*p* of FIG. 22 is shown and described as having a separate switch element 66*p* having a double pole double throw switch 166*p*, it will be appreciated that the switching arrangement 60*p* could, within the intended scope of the invention, also be constructed to omit the switch element 66*p* since the dual NOT gate control 162*p* itself acts as a switch element, the first NOT gate 160*p* and second NOT gate 164*p* acting as switches and being responsive to the logic control system f, causing the input signal line 62*p* to be connected to either the digital interface 48*p* or analog interface 47*p* depending on the type of signal that is present in the input signal line 62*p*.

Figure 23:
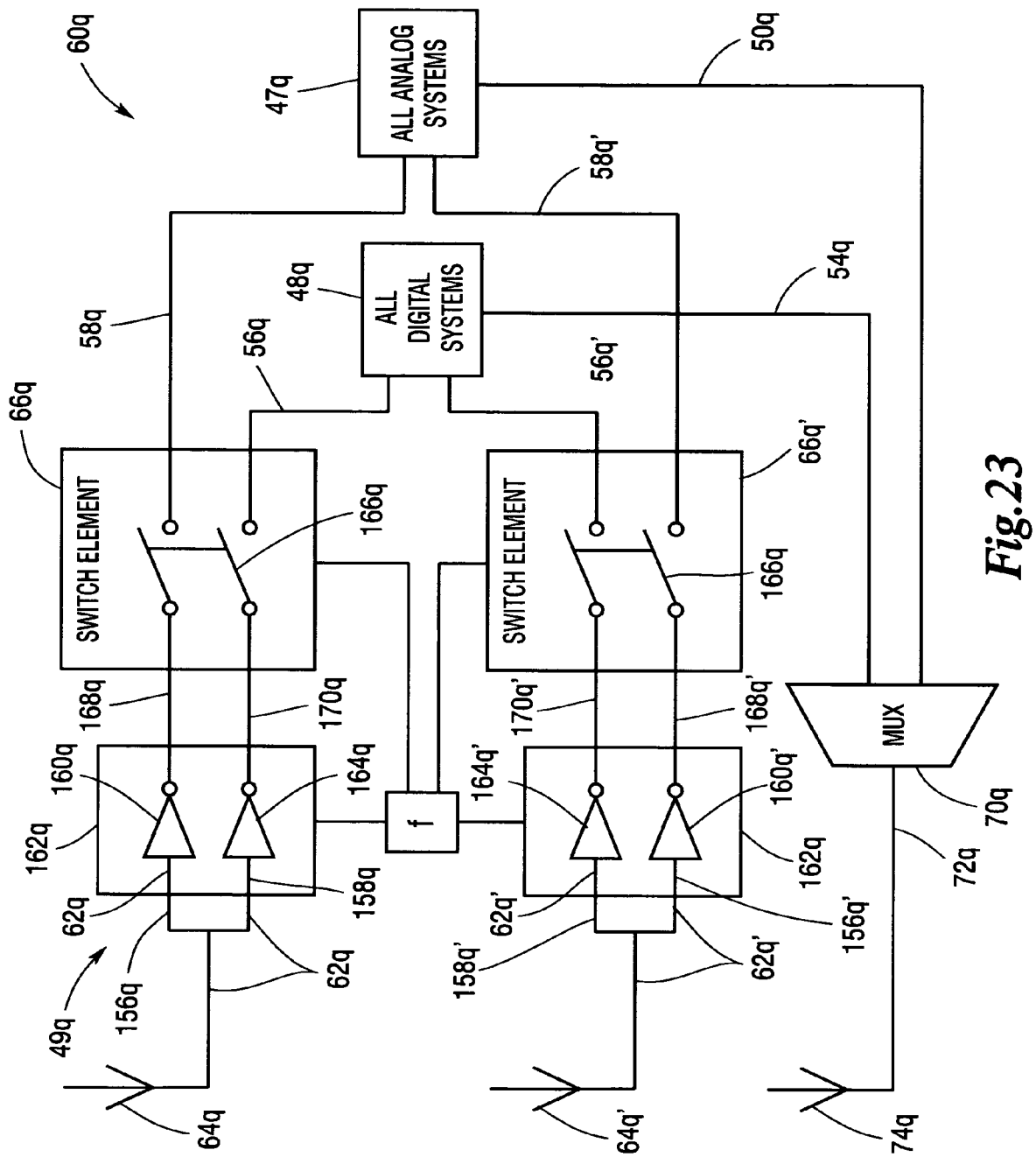
FIG. 23 is a switching arrangement according to one embodiment of the invention.

FIG. 23 depicts a switching arrangement 60*q* of the invention having two input signal lines 62*q* and 62*q*', each input signal line being split into an analog gate line 156*q*/156*q*' and a digital gate line 158*q*/158*q*'. The input signal lines 62*q* and 62*q*' connect to dual NOT gate controls 162*q* and 162*q*' for restricting signals (received signals) received by first and second input signal lines 62*q* and 62*q*' with NOT gates 160*q*/160*q*' and 164*q*/164*q*' controlled by the logic control system f Each of the first and second input signal lines 62*q*/62*q*' is divided into a separate analog gate line 156*q*/156*q*' and digital gate line 158*q*/158*q*' that connect to a first NOT gate 160*q*/160*q*' and second NOT gate 164*q*/164*q*'. The logic control system f is responsive to whether signals present in both input signal lines 62*q* and 62*q*' are analog or digital, and allows received signals to pass through the dual NOT gate controls 162*p* and 162*q*' to the appropriate analog switch lines 168*q* and 168*q*' or digital switch lines 170*q* and 170q' in the same manner and according to the same logical conditions as the dual NOT gate control 162*p* of FIG. 22. The logic control system f, upon detecting a signal in an input signal line 62*q* or 62*q*', connects an analog switch line 168*q* or 168*q*' with a corresponding analog input line 58*q* or 58*q*' and connects a digital switch line 170*q* or 170*q*' with a corresponding digital input line 56*q* or 56*q*'. This allows received signals, analog or digital, that pass through the dual NOT gate control 162*p* or 162*q*', to pass to the appropriate analog or digital interface 47*q* or 48*q*.

The logic control system f can be programmed or otherwise configured to prevent digital signals received by multiple input signal lines from being simultaneously directed to the digital interface 48*q* while allowing analog signals received by multiple input signal lines to be simultaneously directed to the analog interface 47*q*. This may be done by programming the logic control system f so that no more than one of the dual NOT gate controls 162*q* and 162*q*' allows a digital signal to pass through a second NOT gate 164*q* or 164*q*' at any one time. Alternatively, the first and second digital input lines 56*q* and 56*q*' can be connected to the digital interface 48*q* through a common XOR gate (not shown) to prevent simultaneous signal transmission to the digital interface 48*q*.

Although the switching arrangement 60*q* of FIG. 23 is shown and described as having separate switch elements 66*q* and 66*q*' each having a double pole double throw switch 166*q* or 166*q*', it will be appreciated that either switching arrangement 60*q* or 60*q*' could, within the intended scope of the invention, also be constructed to omit a switch element 66*q* or 66*q*' since the dual NOT gate controls 162*q* and 162*q*' themselves act as a switch element, the NOT gates 160*q*/160*q*' and 164*q*/164*q*' acting as switches, being responsive to the logic control system f and causing the input signal lines 62*p* and 62*q*' to be connected to either the digital interface 48*q* or analog interface 47*q* depending on the types of signals present in the input signal lines 62*q* and 62*q*'.

Figure 24:
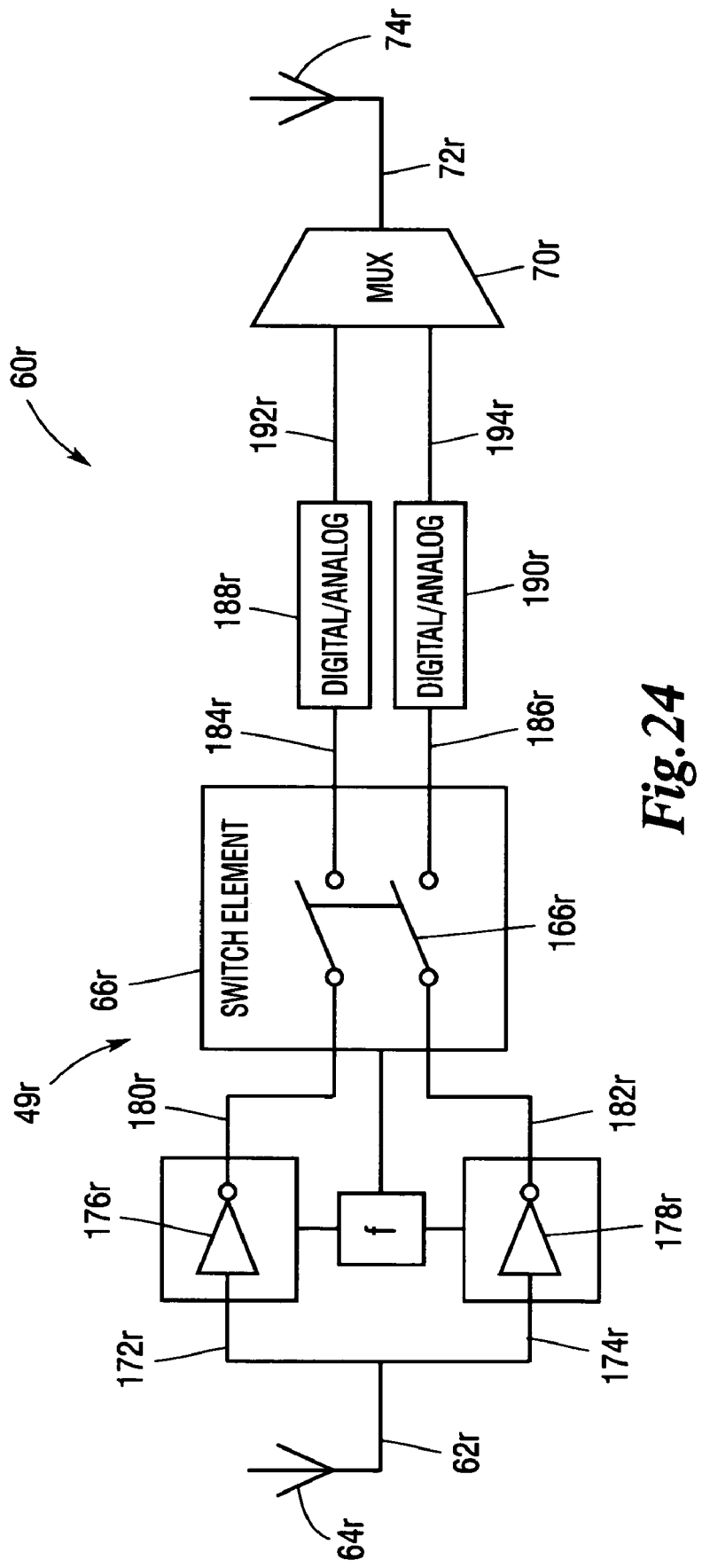
FIG. 24 is a switching arrangement according to one embodiment of the invention.

It will be appreciated that the invention can also be implemented into switching arrangements where one or more interfaces are capable of being converted from analog to digital or from digital to analog, such as for use with devices that are capable of utilizing both analog and digital signals. FIG. 24 depicts a switching arrangement 60*r* of the invention having an input signal line 62*r* that splits into a first gate line 172*r* and a second gate line 174*r*. The first gate line 172*r* connects to a first NOT gate 176*r* and the second gate line 174*r* connects to a second NOT gate 178*r*, both the first NOT gate 176*r* and second NOT gate 178*r* being responsive to the logic control system f. A first switch line 180*r* connects the output of the first NOT gate 176*r* to a switch element 66*r* and a second switch line 182*r* connects the output of the second NOT gate 178*r* to the switch element 66*r*. The switch element 66*r* includes a double pole double throw switch 166*r* capable of simultaneously connecting the first switch line 180*r* to a first input line 184*r* and connecting the second switch line 182*r* to a second input line 186*r*. The first and second input lines 184*r* and 186*r* connect the switch element 166*r* to a first variable interface 188*r* and a second variable interface 190*r*.

Both the first variable interface 188*r* and the second variable interface 190*r* are capable of serving as either analog or digital interfaces, depending on the type of devices that are connected to each interface. Normally, the logic control system f includes programming or a specific configuration that enables the logic control system f to recognize and respond to the interface type assigned to each of the first and second variable interfaces 188*r* and 190*r* at a particular given time.

Consider the switching arrangement 60*r* of FIG. 24 when the first variable interface 188*r* is connected to analog devices, while the second variable interface 190*r* is connected to devices that receive and transmit digital signals. Consider further that an analog signal (received signal) is received by the input signal line 62*r*. The received signal is present in both the first gate line 172*r* and the second gate line 174*r*, the logic control system f detecting that the signal is analog. The logic control system f further recognizes that only the first variable interface 188*r* is assigned to receive analog signals, and accordingly sends a positive voltage (TRUE) logic signal to the second NOT gate 178*r*, activating the second NOT gate 178*r*. No signal is sent to the first NOT gate 176*r*, which remains deactivated.

Since the first NOT gate 176*r* is not activated, the received signal is able to pass through the gate to the switch element 66*r* via the first switch line 180*r*. The logic control system f, detecting the presence of a signal in the input signal line 62*r*, also connects the first switch line 180*r* to the first variable interface 188*r* via the first input line 184*r* to allow the received signal to reach the first variable interface 188*r*. A first output line 192*r* receives analog signals from the devices connected to the first variable interface 188*r* and channels the analog signals to the signal output 74*r* via the multiplexer 70*r* and signal output line 72*r*. Since the second NOT gate 178*r* is activated, the received signal causes the second NOT gate 178*r* to produce an absence of voltage (FALSE) condition at its output, preventing the received signal from passing through the second NOT gate 178*r*.

If the signal received in the input signal line 62*r* changes to a digital signal, the logic control system f, detecting that the received signal and further recognizing that only the second variable interface 190*r* is assigned to receive digital signals, accordingly sends a positive voltage (TRUE) logic signal to the first NOT gate 176*r*, activating the first NOT gate 176*r*. The logic signal from the control system f is removed from the second NOT gate 178*r*, which is then deactivated.

Since the second NOT gate 178*r* is deactivated, the received signal is able to pass through the gate to the switch element 66*r* via the second switch line 182*r*. The logic control system f, detecting the presence of a signal in the input signal line 62*r*, also connects the second switch line 182*r* to the second variable interface 190*r* via the second input line 186*r* to allow the received signal to reach the second variable interface 190*r*. A second output line 194*r* receives analog signals from the devices connected to the second variable interface 190*r* and channels the analog signals to the signal output 74*r* via the multiplexer 70*r* and signal output line 72*r*. Since the first NOT gate 176*r* is activated, the received signal causes the first NOT gate 176*r* to produce an absence of voltage (FALSE) condition at its output, preventing the received signal from passing through the first NOT gate 176*r*.

Now consider the switching arrangement 60*r* when devices connected to the first variable interface 188*r* begin to utilize digital signals, while devices connected to the second variable interface 190*r* begin to utilize analog signals. Consider further that a digital signal continues to be received by the input signal line 62*r*. Due to its programming or configuration, the logic control system f normally recognizes that change in the first and second variable interfaces 188*r* and 190*r*. Accordingly, the logic control system f sends a positive voltage (TRUE) logic signal to the second NOT gate 178*r*, activating the second NOT gate 178*r*. The logic signal from the control system f is removed from the first NOT gate 176*r*, which is then deactivated.

Since the first NOT gate 176r is deactivated, the received signal is able to pass through the gate to the switch element 66r via the first switch line 180r, and is connected with the double pole double throw switch 166r, via the first input line 184r, to the first variable interface 188r, which acts as a digital interface. Since the second NOT gate 178r is activated, the received signal causes the second NOT gate 178r to produce an absence of voltage (FALSE) condition at its output, preventing the received signal from passing through the second NOT gate 178r and reaching the second variable interface 190r.

Figure 25:
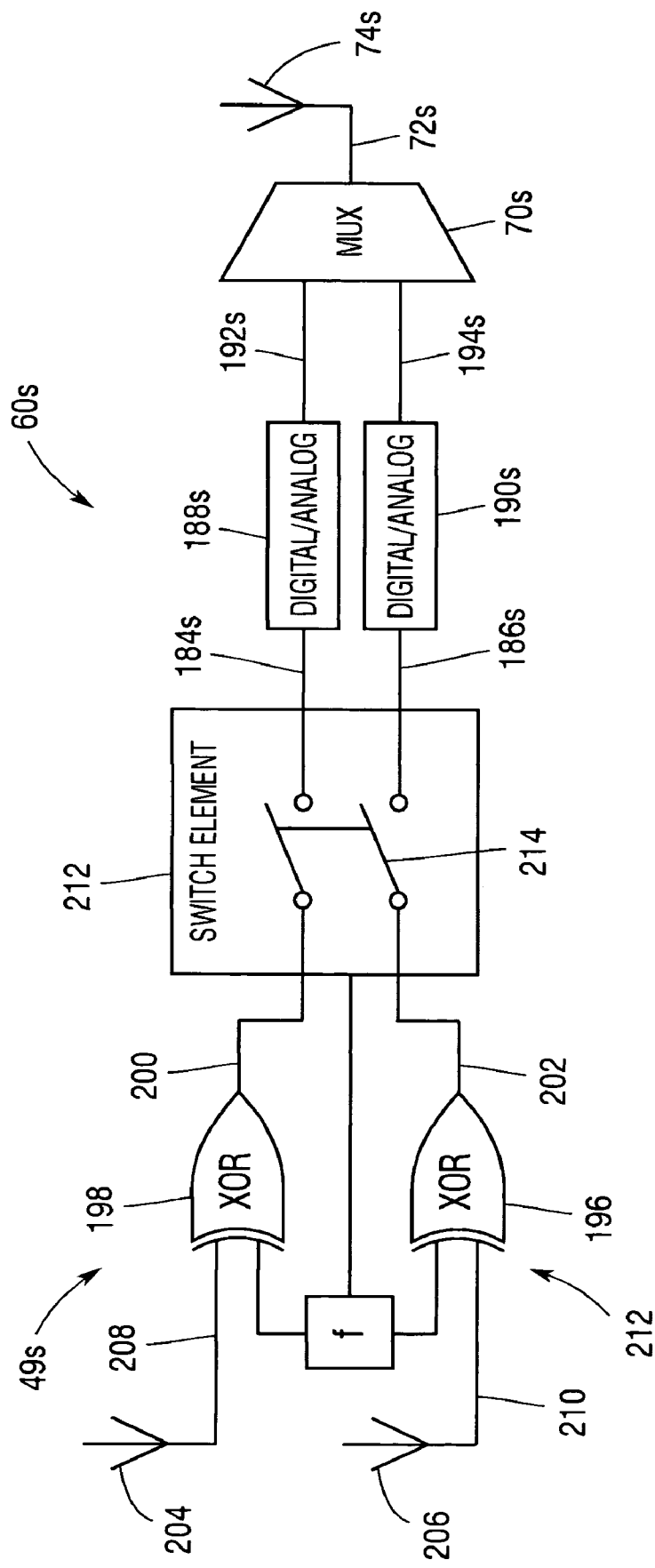
FIG. 25 is a switching arrangement according to one embodiment of the invention.

Although the switching arrangement 60r of FIG. 25 is shown and described as having a separate switch element 66r having a double pole double throw switch 166r, it will be appreciated that the switching arrangement 60r could, within the intended scope of the invention, also be constructed to omit the switch element 66r since the first and second NOT gates 176r and 178r together act as a switch element, the first NOT gate 176r and second NOT gate 178r being switches that are responsive to the logic control system f and causing the input signal line 62r to be connected to either the first variable interface 188r or the second variable interface 190r depending on the type of signal that is present in the input signal line 62r.

It will be appreciated that is some embodiments, especially in switching arrangements having variable interface types, it may be possible for two or more interfaces to be of the same interface type. For example, consider the switching arrangement 60r when devices connected to both the first variable interface 188r and the second variable interface 190r begin to utilize analog signals. The logic control system f, recognizing the condition of both variable interfaces, sends positive voltage (TRUE) signals to both the first NOT gate 176r and the second NOT gate 178r, activating both gates, whenever a digital signal is detected in the input signal line 62r. This prevents the signal from reaching either the first variable interface 188r or the second variable interface 190r. When an analog signal is detected in the input signal line 62r, the logic control system f allows for an absence of voltage (FALSE) condition to exist in both the first NOT gate 176r and the second NOT gate 178r, deactivating both gates to allow the signal to reach both the first variable interface 188r and the second variable interface 190r. Such conditions allow for simultaneous data transmittal to interfaces, which can be useful for conducting operations such as three-way calling.

Some embodiments of the invention can integrate interfaces having variable interface types into switching arrangements that receive signals from multiple sources. For example, FIG. 25 depicts another switching arrangement 60s of the invention having a first variable interface 188s and a second variable interface 190s that are each capable of being converted from analog to digital or from digital to analog. A first input signal line 208 receives signals from a first signal source 204, providing the first signal input of a first XOR gate 198. A second input signal line 210 receives signals from a second signal source 206, providing the first signal input of a second XOR gate 196. The logic control system f of the switching and logic system 49s is responsive to the type of signals present in both the first input signal line 208 and second input signal line 210, and provides second signal inputs for both the first and second XOR gates 198 and 196.

A first switch line 200 connects the output of the first XOR gate 198 to a switch element 212 and a second switch line 202 connects the output of the second XOR gate 196 to the switch element 212. The switch element 212 includes a double pole double throw switch 214 capable of simultaneously connecting the first switch line 200 to a first input line 184s and connecting the second switch line 202 to a second input line 186s. The first and second input lines 184s and 186s connect the switch element 212 to a first variable interface 188s and a second variable interface 190s.

Consider the switching arrangement 60s of FIG. 25 when the first variable interface 188s is connected to devices that receive and transmit analog signals, while the second variable interface 190s is connected to devices that receive and transmit digital signals. Consider further that analog signals (received signals) are received by both the first input signal line 208 and second input signal line 210. The received signals create positive voltage (TRUE) conditions for the first signal inputs of the first XOR gate 198 and second XOR gate 196. The logic control system f detects the presence of analog signals in the input signal lines 208 and 210, and recognizing the condition of both interfaces, sends a positive voltage (TRUE) logic signal to the second XOR gate 196, creating a second positive voltage (TRUE) condition for the second signal input of the second XOR gate 196. This prevents the received signal from passing through the second XOR gate 196 due to the two positive voltage (TRUE) conditions of the gate. However, the logic control system f does not send a signal to the first XOR gate 198, allowing an absence of voltage (FALSE) condition to exist in the second signal input of the first XOR gate 198, allowing the received signal to pass through the first XOR gate 198 due to the single positive voltage (TRUE) condition of the gate.

Since the received signal can pass through only the first XOR gate 198, the received signal passes to the switch element 212 only through the first switch line 200. The logic control system f, detecting the presence of signals in the input signal lines 208 and 210, also connects the first switch line 200 to the first variable interface 188s with the double pole double throw switch 214 via the first input line 184s to allow the received signal to reach the first variable interface 188s. A first output line 192s receives analog signals from the devices connected to the first variable interface 188s and channels the analog signals to the signal output 74s via the multiplexer 70s and signal output line 72s.

If the signal received in both input signal lines 208 and 210 change to digital signals, the logic control system f, detecting that the received signal is digital and further recognizing that only the second variable interface 190s is assigned to receive digital signals, accordingly sends a positive voltage (TRUE) logic signal to the first XOR gate 198, creating a second positive voltage (TRUE) condition for the second signal input of the first XOR gate 198. This prevents the received signal from passing through the first XOR gate 198 due to the two positive voltage (TRUE) conditions of the gate. However, the logic control system f removes its positive voltage (TRUE) logic signal to the second XOR gate 196, allowing an absence of voltage (FALSE) condition to exist in the second signal input of the second XOR gate 196. This allows the received signal to pass through the second XOR gate 196 due to the single positive voltage (TRUE) condition of the gate.

Since the received signal can pass through only the second XOR gate 196, the received signal passes to the switch element 212 only through the second switch line 202. The logic control system f, detecting the presence of signals in the input signal lines 208 and 210, also connects the second switch line 202 to the second variable interface 190s with the double pole double throw switch 214 via the second input line 186s to allow the received signal to reach the second variable interface 190s. A second output line 194s receives digital signals from the devices connected to the second variable interface 190s and channels the digital signals to the signal output 74s via the multiplexer 70s and signal output line 72s.

Now consider the switching arrangement 60s when devices connected to the first variable interface 188s begin to utilize digital signals, while devices connected to the second variable interface 190s begin to utilize analog signals. Consider further that digital signals continue to be received by both the first and second input signal line 208 and 210. Due to its programming or configuration, the logic control system f normally recognizes the change in the first and second variable interfaces 188s and 190s. Accordingly, the logic control system f creates a positive voltage (TRUE) condition for the second signal input of the second NOT gate 196. This prevents the received signal from passing through the second NOT gate 196 due to the two positive voltage (TRUE) conditions of the gate. However, the logic control system f removes its positive voltage (TRUE) logic signal to the first XOR gate 198, allowing an absence of voltage (FALSE) condition to exist in the second signal input of the first XOR gate 198. This allows the received signal to pass through the first XOR gate 198 due to the single positive voltage (TRUE) condition of the gate.

Since the received signal can pass through only the first XOR gate 198, the received signal passes to the switch element 212 only through the first switch line 200. The logic control system f, detecting the presence of signals in the input signal lines 208 and 210, also connects the first switch line 200 to the first variable interface 188s with the double pole double throw switch 214 via the first input line 184s to allow the received signal to reach the first variable interface 188s.

Although the switching arrangement 60s of FIG. 25 is shown and described as having a separate switch element 212 having a double pole double throw switch 214, it will be appreciated that the switching arrangement 60s could, within the intended scope of the invention, also be constructed to omit the switch element 212 since the first and second XOR gates 198 and 196 together act as a switch element, the first XOR gate 198 and second XOR gate 196 being switches that are responsive to the logic control system f and causing the input signal lines 208 and 206 to be connected to either the first variable interface 188s or the second variable interface 190s depending on the type of signal that is present in the input signal lines 208 and 206.

The first and second variable interfaces 188r and 190r can also be of the same interface type simultaneously. For example, consider the switching arrangement 60s when devices connected to both the first variable interface 188s and the second variable interface 190s begin to utilize analog signals. If digital signals are received by both input signal lines 208 and 210, the logic control system f, recognizing the condition of both variable interfaces, sends positive voltage (TRUE) signals to both the first XOR gate 198 and the second XOR gate 196, creating second positive voltage inputs for both gates. This prevents the signal from reaching either the first variable interface 188s or the second variable interface 190s. If analog signals are detected in both input signal lines 208 and 210, the logic control system f allows for an absence of voltage (FALSE) condition to exist in both the first XOR gate 198 and the second XOR gate 196, removing second positive voltage inputs from both gates to allow the received signals to reach both the first variable interface 188s and the second variable interface 190s. Such conditions also allow for simultaneous data transmittal to interfaces, as is useful for conducting operations such as three-way calling.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A switching arrangement for a communication platform comprising: an input signal line for receiving signals that have been received by said communication platform;
   a logic control system that is responsive to whether signals that are being received by said input signal line are analog or digital and a switch element having a switch;
   said switch element being responsive to said logic control system to cause said switch element to connect said input signal line to a digital interface when signals received by said input signal line are digital and to cause said switch element to connect said input signal line to an analog interface when signals received by said input signal line are analog;
   a first NOT gate that is responsive to said logic control system, said first NOT gate connecting said input signal line to said switch element when signals received by said input signal line are analog and disconnecting said input signal line from said switch element when signals received by said input signal line are not analog; a second NOT gate that is responsive to said logic control system, said second NOT gate connecting said input signal line to said switch element when signals received by said input signal line are digital and disconnecting said input signal line from said switch element when signals received by said input signal line are not digital; and said switch of said switch element being double pole double throw.

2. The switch arrangement of claim 1 wherein said switch is at least single pole and at least double throw.

3. The switching arrangement of claim 1 wherein the signals received by said input signal line are voice signals when the signals are analog.

4. The switching arrangement of claim 1 wherein the signals received by said input signal line are data signals when the signals are digital.

5. The switching arrangement of claim 1 wherein said switch is capable of high speed switching.

6. The switching arrangement of claim 1 further comprising a multiplexer, said analog interface connected to said multiplexer with an analog output line, said digital interface connected to said multiplexer through a digital output line, said multiplexer connecting each of said analog output line and said digital output line to a signal output line for subsequent modulation and transmission by said communication platform.

7. The switching arrangement of claim 1 further comprising: an audio input interface for receiving signals that are analog; a multiplexer, said audio input interface connected to said multiplexer with an audio output line, said digital interface connected to said multiplexer through a digital output line, said multiplexer connecting each of said audio output line and said digital output line to a signal output line for subsequent modulation and transmission by said communication platform.

8. The switching arrangement of claim 1 wherein at least one audio system is connected to said analog interface, said switch element connecting said input signal line to said at least one audio system through said analog interface when signals received by said input signal line arc analog.

9. The switching arrangement of claim 1 wherein a plurality of audio systems is connected to said analog interface, said switch element connecting said input signal line to said audio systems through said analog interface when signals received by said input signal line are analog.

10. The switching arrangement of claim 1 wherein an audio converter is connected to said analog interface, said switch element connecting said input signal line to said audio converter through said analog interface when signals received by said input signal line are analog.

11. The switching arrangement of claim 1 at least one network system is connected to said digital interface, said switch element connecting said input signal line to said at least one network system through said digital interface when signals received by said input signal line are digital.

12. The switching arrangement of claim 1 wherein said digital interface is connected to a plurality of network systems, said switch element connecting said input signal line to said network systems through said digital interface when signals received by said input signal line are digital.

13. The switching arrangement of claim 1 wherein a computer system is connected to said digital interface, said switch element connecting said input signal line to said computer system through said digital interface when signals received by said input signal line are digital.

14. The switching arrangement of claim 1 wherein said switch of said switch element is double pole double throw.

15. The switching arrangement of claim 1 further comprising a demodulator for demodulating signals received by said communication platform after the signals are received from said switch element by at least one of said digital interface and said analog interface.

16. The switching arrangement of claim 1 further comprising: an amplifier for amplifying signals received by said communication platform before the signals are received by said input signal line; and a demodulator for demodulating signals received by said communication platform after the signals are received from said switch element by at least one of said digital interface and said analog interface.

17. The switching arrangement of claim 1 further comprising an amplifier for amplifying signals received by said communication platform before the signals are received by said input signal line.

18. The switching arrangement of claim 1 further comprising a multiplexer having a first multiplexer condition and a second multiplexer condition, said multiplexer being responsive to said logic control system and assuming the first multiplexer condition when signals that are being received by said input signal line are digital and assuming the second multiplexer condition when signals that are being received by said input signal line are analog, said switch element being responsive to said multiplexer to cause said switch element to connect said input signal line to said digital interface when said multiplexer assumes the first multiplexer condition and to cause said switch element to connect said input signal line to said analog interface when said multiplexer assumes the second multiplexer condition.

19. The switching arrangement of claim 1 wherein said logic control system is responsive to a remote tower identification number that is associated with the signal received by said input signal line.

20. The switching arrangement of claim 1 wherein said logic control system is responsive to a communications signature protocol that is associated with the signal received by said input signal line.

21. The switching arrangement of claim 1 wherein said switch comprises at least one XOR gate, said XOR gate being responsive to said logic control system.

22. The switching arrangement of claim 1 wherein said logic control system is responsive to an Internet protocol address that is associated with the signal received by said input signal line.

23. The switching arrangement of claim 1 wherein said switch element is integrated into a demultiplexer.

24. The switching arrangement of claim 1 wherein said switch element is integrated into a programmable logic chip.

25. The switching arrangement of claim 1 wherein said logic control system includes a function transfer filter, said function transfer filter having a first filter condition and a second filter condition, said function transfer filter assuming the first filter condition when signals that are being received by said input signal line are digital and assuming the second filter condition when signals that are being received by said input signal line are analog, said switch element being responsive to said function transfer filter to cause said switch element to connect said input signal line to said digital interface when said function transfer filter assumes the first filter condition and to cause said switch element to connect said input signal line to said analog interface when said function transfer filter assumes the second filter condition.

26. The switching arrangement of claim 25 wherein said function transfer filter includes a narrow bandwidth bypass filter.

27. The switching arrangement of claim 25 wherein said function transfer filter includes an active high pass filter.

28. The switching arrangement of claim 1 wherein said logic control system is responsive to a phone number that is associated with the signal received by said input signal line.

29. The switching arrangement of claim 1 wherein said logic control system is responsive to a bandwidth of the signal that is received by said input signal line.

30. The switching arrangement of claim 1 wherein said logic control system is responsive to an Internet address that is associated with the signal received by said input signal line.

31. The switching arrangement of claim 1 wherein said logic control system Is responsive to an Internet service provider number that is associated with the signal received by said input signal line.

32. The switching arrangement of claim 1 wherein said logic control system is responsive to a satellite signal identification number that is associated with the signal received by said input signal line.

33. The switching arrangement of claim 1 wherein said logic control system is responsive to a password that is associated with the signal received by said input signal line.

34. The switching arrangement of claim 1 wherein said communication platform is a mobile platform.

35. The switching arrangement of claim 1 wherein said communication platform includes a telephone system.

36. The switching arrangement of claim 1 wherein said communication platform includes a cellular telephone system.

37. The switching arrangement of claim 1 wherein said communication platform includes a television system.

38. The switching arrangement of claim 1 wherein said communication platform includes a computer system.

39. The switching arrangement of claim 1 wherein said communication platform includes a navigation system.

40. The switching arrangement of claim 1 wherein said communication platform includes a satellite receiver system.

41. The switching arrangement of claim 1 wherein said communication platform includes an electronic game system.

42. A switching arrangement for a communication platform comprising: an input signal line for receiving signals that have been received by said communication platform;

a logic control system that is responsive to whether signals that are being received by said input signal line are analog or digital and a switch element having a switch;

said switch element being responsive to said logic control system to cause said switch element to connect said input signal line to a digital interface when signals received by said input signal line are digital and to cause said switch element to connect said input signal line to an analog interface when signals received by said input signal line are analog;

a first NOT gate that is responsive to said logic control system, said first NOT gate connecting said input signal line to said switch element when signals received by said input signal line are analog and when said first NOT gate is connectable to said analog interface, said first NOT gate connecting said input signal line to said switch element when signals received by said input signal line are digital and when said first NOT gate is connectable to said digital interface; a second NOT gate that is responsive to said logic control system, said second NOT gate connecting said input signal line to said switch element when signals received by said input signal line are digital and when said second NOT gate is connectable to said digital interface, said second NOT gate connecting said input signal line to said switch element when signals received by said input signal line are analog and when said second NOT gate is connectable to said analog interface; and said switch of said switch element being double pole double throw.

43. A switching arrangement for a communication platform comprising: an input signal line for receiving signals that have been received by said communication platform;

a logic control system that is responsive to whether signals that are being received by said input signal line are analog or digital and a switch element having a switch;

said switch element being responsive to said logic control system to cause said switch element to connect said input signal line to a digital interface when signals received by said input signal line are digital and to cause said switch element to connect said input signal line to an analog interface when signals received by said input signal line are analog;

a first XOR gate that is responsive to said logic control system, said first XOR gate connecting said input signal line to said analog interface when signals received by said input signal line are analog and when said first XOR gate is connectable to said analog interlace, said first XOR gate connecting said input signal line to said digital interface when signals received by said input signal line are digital and when said first XOR gate is connectable to said digital interface; and a second XOR gate that is responsive to said logic control system, said second XOR gate connecting said input signal line to said digital interface when signals received by said input signal line are digital and when said second XOR gate is connectable to said digital interface, said second XOR gate connecting said input signal line to said switch element when signals received by said input signal line are analog and when said second XOR gate is connectable to said analog interface.

44. A switching arrangement for a communication platform comprising; a first input signal line and a second input signal line for receiving signals that have been received by said communication platform; a switch element having a first switch and a second switch; a logic control system that is responsive to whether signals that are being received by each of said first input signal line and said second input signal line are analog or digital; said switch element being responsive to said logic control system to cause said first switch to connect said first input signal line to a digital interface when signals received by said first input signal line are digital and to cause said first switch to connect said first input signal line to an analog interface when signals received by said first input signal line are analog; and said switch element being responsive to said logic control system to cause said second switch to connect said second input signal line to a digital interface when signals received by said second input signal line are digital and to cause said second switch to connect said second input signal line to an analog interface when signals received by said second input signal line are analog;

an XOR gate, said XOR gate connecting said first switch to said digital interface when a signal received by said first input signal line is digital and when said second switch does not connect said second input signal line to said XOR gate, said XOR gate connecting said second switch to said digital interface when a signal received by said second input signal line is digital and when said first switch does not connect said first input signal line with said XOR gate.

45. The switching arrangement of claim 44 further comprising: a first amplifier for amplifying signals received by said communication platform before the signals are received by said first input signal line; and a second amplifier for amplifying signals received by said communication platform before the signals are received by said second input signal line.

46. The switching arrangement of claim 44 wherein each of said first switch and said second switch are at least single pole and at least double throw.

47. The switching arrangement of claim 44 wherein said first switch is capable of high speed switching.

48. The switching arrangement of claim 44 wherein said second switch is capable of high speed switching.

49. The switching arrangement of claim 44 wherein each of said first switch and said second switch are capable of high speed switching.

50. The switching arrangement of claim 44 wherein the signals received by at least one of said first input signal line and said second input signal line are voice signals when the signals received by at least one of said first input signal line and said second input signal line are analog.

51. The switching arrangement of claim 44 wherein the signals received by at least one of said first input signal line and said second input signal line are data signals when the signals received by at least one of said first input signal line and said second input signal line are digital.

52. The switching arrangement of claim 44 further comprising: a first multiplexer having a first multiplexer condition and a second multiplexer condition, said first multiplexer being responsive to said logic control system and assuming the first multiplexer condition when signals that are being received by said first input signal line are digital and assuming the second multiplexer condition when signals that are being received by said first input signal line are analog, said switch element being responsive to said first multiplexer to cause said first switch to connect said first input signal line to said digital interface when said first multiplexer assumes the first multiplexer condition and to cause said first switch to connect said first input signal line to said analog interface when said first multiplexer assumes the second multiplexer condition; and a second multiplexer having a first multiplexer condition and a second multiplexer condition, said second multiplexer being responsive to said logic control system and assuming the first multiplexer condition when signals that are being received by said second input signal line are digital and assuming the second multiplexer condition when signals that are being received by said second input signal line are analog, said switch element being responsive to said second multiplexer to cause said second switch to connect said second input signal line to said digital interface when said second multiplexer assumes the first multiplexer condition and to cause said second switch to connect said second input signal line to said analog interface when said second multiplexer assumes the second multiplexer condition.

53. The switching arrangement of claim 44 further comprising a multiplexer, said analog interface connected to said multiplexer with an analog output line, said digital interface connected to said multiplexer through a digital output line, said multiplexer connecting each of said analog output line and said digital output line to a signal output line for subsequent modulation and transmission by said communication platform.

54. The switching arrangement of claim 44 further comprising: an audio input interface for receiving signals that are analog; a multiplexer, said audio input interface connected to said multiplexer with an audio output line, said digital interface connected to said multiplexer through a digital output line, said multiplexer connecting each of said audio output line and said digital output line to a signal output line for subsequent modulation and transmission by said communication platform.

55. The switching arrangement of claim 44 wherein at least one audio system is connected to said analog interface, said switch element connecting at least one of said first input signal line and said second input signal line to said audio system through said analog interface when signals received by at least one of said first input signal line and said second input signal line are analog.

56. The switching arrangement of claim 44 wherein a plurality of audio systems is connected to said analog interface, said switch element connecting at least one of said first input signal line and said second input signal line to said audio systems through said analog interface when signals received by at least one of said first input signal line and said second input signal line are analog.

57. The switching arrangement of claims 2 wherein an audio converter is connected to said analog interface, said switch element connecting said at least one of said first input signal line and said second input signal line to said audio converter through said analog interface when signals received by at least one of said first input signal line and said second input signal line are analog.

58. The switching arrangement of claim 44 wherein at least one network system is connected to said digital interface, said switch element connecting at least one of said first input signal line and said second input signal line to said at least one network system through said digital interface when signals received by at least one of said first input signal line and said second input signal line are digital.

59. The switching arrangement of claim 44 wherein said digital interface is connected to a plurality of network systems, said switch element connecting at least one of said first input signal line and said second input signal line to said network systems through said digital interface when signals received by at least one of said first input signal line and said second input signal line are digital.

60. The switching arrangement of claim 44 wherein a computer system is connected to said digital interface, said switch element connecting at least one of said first input signal line and said second input signal line to said computer system through said digital interface when signals received by at least one of said first input signal line and said second input signal line are digital.

61. The switching arrangement of claim 44 wherein said each of said first switch and said second switch of said switch element are double pole double throw.

62. The switching arrangement of claim 44 further comprising a demodulator for demodulating signals received by said communication platform after the signals are received from said switch element by at least one of said digital interface and said analog interface.

63. The switching arrangement of claim 44 further comprising: a first amplifier for amplifying signals received by said communication platform before the signals are received by said first input signal line; a second amplifier for amplifying signals received by said communication platform before the signals are received by said second input signal line; and a demodulator for demodulating signals received by said communication platform after the signals are received from said switch element by at least one of said digital interface and said analog interface.

64. A switching arrangement for a communication platform comprising: a first input signal line and a second input signal line for receiving signals that have been received by said communication platform; a switch element having a first switch and a second switch; a logic control system that is responsive to whether signals that are being received by each of said first input signal line and said second input signal line are analog or digital; said switch element being responsive to said logic control system to cause said first switch to connect said first input signal line to a digital interface when signals received by said first input signal line are digital and to cause said first switch to connect said first input signal line to an analog interface when signals received by said first input signal line are analog; and said switch element being responsive to said logic control system to cause said second switch to connect said second input signal line to a digital interface when signals received by said second input signal line are digital and to cause said second switch to connect said second input signal line to an analog interface when signals received by said second input signal line are analog;

first NOT gate that is responsive to said logic control system, said first NOT gate connecting said first input signal line to said switch element when signals received by said first input signal line are analog and when said first NOT gate is connectable to said analog interface, said first NOT gate connecting said first input signal line to said switch element when signals received by said first input signal line are digital and when said first NOT gate is connectable to said digital interface; a second NOT gate that is responsive to said logic control system, said second NOT gate connecting said first input signal line to said switch element when signals received by said first input signal line are digital and when said second NOT gate is connectable to said digital interface, said second NOT gate connecting said first input signal line to said switch element when signals received by said first input signal line are analog and when said second NOT gate is connectable to said analog interface; a third NOT gate that is responsive to said logic control system, said third NOT gate connecting said second input signal line to said switch element when signals received by said second input signal line are analog and when said third NOT gate is connectable to said analog interface, said third NOT gate connecting said second input signal line to said switch element when signals received by said second input signal line are digital and when said third NOT gate is connectable to said digital interface; a fourth NOT gate that is responsive to said logic control system, said fourth NOT gate connecting said second input signal line to said switch element when signals received by said second input signal line are digital and when said fourth NOT gate is connectable to said digital interface, said fourth NOT gate connecting said second input signal line to said switch element when signals received by said second input signal line are analog and when said fourth NOT gate is connectable to said analog interface; each of said first switch and said second switch of said switch element being double pole double throw.

65. The switching arrangement of claim 64 wherein each of said first switch and said second switch comprise at least one XOR gate, each said XOR gate being responsive to said logic control system.

66. A switching arrangement for a communication platform comprising: a first input signal line and a second input signal line for receiving signals that have been received by said communication platform; a switch element having a first switch and a second switch; a logic control system that is responsive to whether signals that are being received by each of said first input signal line and said second input signal line are analog or digital; said switch element being responsive to said logic control system to cause said first switch to connect said first input signal line to a digital interface when signals received by said first input signal line are digital and to cause said first switch to connect said first input signal line to an analog interface when signals received by said first input signal line are analog; and said switch element being responsive to said logic control system to cause said second switch to connect said second input signal line to a digital interface when signals received by said second input signal line are digital and to cause said second switch to connect said second input signal line to an analog interface when signals received by said second input signal line are analog;

a first NOT gate that is responsive to said logic control system, said first NOT gate connecting said first input signal line to said switch element when signals received by said first input signal line are analog and disconnecting said first input signal line from said switch element when signals received by said first input signal line are not analog; a second NOT gate that is responsive to said logic control system, said second NOT gate connecting said first input signal line to said switch element when signals received by said first input signal line are digital and disconnecting said first input signal line from said switch element when signals received by said first input signal line are not digital; a third NOT gate that is responsive to said logic control system, said third NOT gate connecting said second input signal line to said switch element when signals received by said second input signal line are analog and disconnecting said second input signal line from said switch element when signals received by said second input signal line are not analog; and a fourth NOT gate that is responsive to said logic control system, said fourth NOT gate connecting said second input signal line to said switch element when signals received by said second input signal line arc digital and disconnecting said second input signal line from said switch element when signals received by said second input signal line are not digital; and each of said first switch and said second switch of said switch clement being double pole double throw.

67. A switching arrangement for a communication platform comprising: a first input signal line and a second input signal line for receiving signals that have been received by said communication platform; a switch element having a first switch and a second switch; a logic control system that is responsive to whether signals that are being received by each of said first input signal line and said second input signal line are analog or digital; said switch element being responsive to said logic control system to cause said first switch to connect said first input signal line to a digital interface when signals received by said first input signal line are digital and to cause said first switch to connect said first input signal line to an analog interface when signals received by said first input signal line are analog; and said switch element being responsive to said logic control system to cause said second switch to connect said second input signal line to a digital interface when signals received by said second input signal line are digital and to cause said second switch to connect said second input signal line to an analog interface when signals received by said second input signal line are analog;

a first XOR gate that is responsive to said logic control system, said first XOR gate connecting said first input signal line to said analog interface when signals received by said first input signal line arc analog and when said first XOR gate is connectable to said analog interface, said first XOR gate connecting said first input signal line to said digital interface when signals received by said first input signal line are digital and when said first XOR gate is connectable to said digital interface; and a second XOR gate that is responsive to said logic control system, said second XOR gate connecting said second input signal line to said digital interface when signals received by said second input signal line are digital and when said second XOR gate is connectable to said digital interface, said second XOR gate connecting said second input signal line to said switch element when signals received by said second input signal line are analog and when said second XOR gate is connectable to said analog interface.

68. The switching arrangement of claim 67 wherein said switch element is integrated into a demultiplexer.

69. The switching arrangement of claim 67 wherein said switch element is integrated into a programmable logic chip.

70. The switching arrangement of claim 67 wherein said logic control system is responsive to a phone number that is associated with a signal received by at least one of said first input signal line and said second input signal line.

71. The switching arrangement of claim 67 wherein said logic control system is responsive to a bandwidth of a signal that is received by at least one of said first input signal line and said second input signal line.

72. The switching arrangement of claim 67 further comprising: a first function transfer filter having a first filter condition and a second filter condition, said first function transfer filter being responsive to said logic control system and assuming the first filter condition when signals that are being received by said first input signal line are digital and assuming the second filter condition when signals that are being received by said first input signal line are analog, said switch element being responsive to said function transfer filter to cause said first switch to connect said first input signal line to said digital interface when said first function transfer filter assumes the first filter condition and to cause said first switch to connect said first input signal line to said analog interface when said first function transfer filter assumes the second filter condition; and a second function transfer filter having a first filter condition and a second filter condition, said second function transfer filter assuming the first filter condition when signals that are being received by said second input signal line are digital and assuming the second filter condition when signals that are being received by said second input signal line are analog, said switch element being responsive to said second function transfer filter to cause said second switch to connect said second input signal line to said digital interface when said second function transfer filter assumes the first filter condition and to cause said second switch to connect said second input signal line to said analog interface when said second function transfer filter assumes the second filter condition.

73. The switching arrangement of claim 72 wherein at least one of said first function transfer filter and said second function transfer filter includes a narrow bandwidth bypass filter.

74. The switching arrangement of claim 72 wherein at least one of said first function transfer filter and said second function transfer filter includes an active high pass filter.

75. The switching arrangement of claim 67 wherein said logic control system is responsive to an Internet address that is associated with a signal that is received by at least one of said first input signal line and said second input signal line.

76. The switching arrangement of claim 67 wherein said logic control system is responsive to an Internet service provider number that is associated with a signal that is received by at least one of said first input signal line and said second input signal line.

77. The switching arrangement of claim 67 said logic control system is responsive to a remote tower identification number that is associated with a signal that is received by at least one of said first input signal line and said second input signal line.

78. The switching arrangement of claim 67 wherein said logic control system is responsive to a communications signature protocol that is associated with the signal received by at least one of said first input signal line and said second input signal line.

79. The switching arrangement of claim 67 wherein said logic control system is responsive to an Internet protocol address that is associated with the signal received by at least one of said first input signal line and said second input signal line.

80. The switching arrangement of claim 67 wherein said logic control system is responsive to a satellite signal identification number that is associated with the signal received by at least one of said first input signal line and said second input signal line.

81. The switching arrangement of claim 67 wherein said logic control system is responsive to a password that is associated with the signal received by at least one of said first input signal line and said second input signal line.

82. The switching arrangement of claim 67 wherein said communication platform is a mobile platform.

83. The switching arrangement of claim 67 wherein said communication platform includes a telephone system.

84. The switching arrangement of claim 67 wherein said communication platform includes a cellular telephone system.

85. The switching arrangement of claim 67 wherein said communication platform includes a television system.

86. The switching arrangement of claim 67 wherein said communication platform includes a computer system.

87. The switching arrangement of claim 67 wherein said communication platform includes a navigation system.

88. The switching arrangement of claim 67 wherein said communication platform includes a satellite receiver system.

89. The switching arrangement of claim 67 wherein said communication platform includes an electronic game system.

90. A switching arrangement for a communication platform comprising: an input signal line for receiving signals that have been received by said communication platform; a logic control system that is responsive to whether signals that are being received by said input signal line are voice signals or data signals; and a switch element having a switch, said switch element being responsive to said logic control system to cause said switch element to connect said input signal line to a digital interface when signals received by said input signal line are data signals and to cause said switch element to connect said input signal line to an analog interface when signals received by said input signal line are voice signals;
a first NOT gate that is responsive to said logic control system, said first NOT gate connecting said input signal line to said switch element when signals received by said input when signals received by said input signal line are not voice signals; a second NOT gate that is responsive to said logic control system, said second NOT gate connecting said input signal line to said switch element when signals received by said input signal line are data signals and disconnecting said input signal line from said switch element when signals received by said input signal line are not data signals; and said switch of said switch element being double pole double throw.

91. The switching arrangement of claim 90 further comprising an amplifier for amplifying signals received by said communication platform before the signals are received by said input signal line.

92. The switching arrangement of claim 90 further comprising a multiplexer having a first multiplexer condition and a second multiplexer condition, said multiplexer being responsive to said logic control system and assuming the first multiplexer condition when signals that are being received by said input signal line are data signals and assuming the second multiplexer condition when signals that arc being received by said input signal line are voice signals, said switch element being responsive to said multiplexer to cause said switch element to connect said input signal line to said digital interface when said multiplexer assumes the first multiplexer condition and to cause said switch element to connect said input signal line to said analog interface when said multiplexer assumes the second multiplexer condition.

93. The switching arrangement of claim 90 wherein said switch is at least single pole and at least double throw.

94. The switching arrangement of claim 90 wherein said switch is capable of high speed switching.

95. The switching arrangement of claim 90 further comprising a multiplexer, said analog interface connected to said multiplexer with an analog output line, said digital interface connected to said multiplexer through a digital output line, said multiplexer connecting each of said analog output line and said digital output line to a signal output line for subsequent modulation and transmission by said communication platform.

96. The switching arrangement of claim 90 further comprising: an audio input interface for receiving signals that are voice signals; a multiplexer, said audio input interface connected to said multiplexer with an audio output line, said digital interface connected to said multiplexer through a digital output line, said multiplexer connecting each of said audio output line and said digital output line to a signal output line for subsequent modulation and transmission by said communication platform.

97. The switching arrangement of claim 90 wherein at least one audio system is connected to said analog interface, said switch element connecting said input signal line to said at least one audio system through said analog interface when signals received by said input signal line are voice signals.

98. The switching arrangement of claim 90 wherein a plurality of audio systems is connected to said analog interface, said switch element connecting said input signal line to said audio systems through said analog interface when signals received by said input signal line are voice signals.

99. The switching arrangement of claim 90 wherein an audio converter is connected to said analog interface, said switch element connecting said input signal line to said audio converter through said analog interface when signals received by said input signal line are voice signals.

100. The switching arrangement of claim 90 wherein at least one network system is connected to said digital interface, said switch element connecting said input signal line to said at least one network system through said digital interface when signals received by said input signal line are data signals.

101. The switching arrangement of claim 90 wherein said digital interface is connected to a plurality of network systems, said switch element connecting said input signal line to said network systems through said digital interface when signals received by said input signal line are data signals.

102. The switching arrangement of claim 90 wherein a computer system is connected to said digital interface, said switch element connecting said input signal line to said computer system through said digital interface when signals received by said input signal line are data signals.

103. The switching arrangement of claim 90 wherein said switch of said switch element is double pole double throw.

104. The switching arrangement of claim 90 further comprising a demodulator for demodulating signals received by said communication platform after the signals are received from said switch element by at least one of said digital interface and said analog interface.

105. The switching arrangement of claim 90 further comprising: an amplifier for amplifying signals received by said communication platform before the signals are received by said input signal line; and a demodulator for demodulating signals received by said communication platform after the signals are received from said switch element by at least one of said digital interface and said analog interface.

106. A switching arrangement for a communication platform comprising: an input signal line for receiving signals that have been received by said communication platform; a logic control system that is responsive to whether signals that are being received by said input signal line are voice signals or data signals; and a switch element having a switch, said switch element being responsive to said logic control system to cause said switch element to connect said input signal line to a digital interface when signals received by said input signal line are data signals and to cause said switch element to connect said input signal line to an analog interface when signals received by said input signal line are voice signals;

a first NOT gate that is responsive to said logic control system, said first NOT gate connecting said input signal line to said switch element when signals received by said input signal line are voice signals and when said first NOT gate is connectable to said analog interface, said first NOT gate connecting said input signal line to said switch element when signals received by said input signal line are data signals and when said first NOT gate is connectable to said digital interface; a second NOT gate that is responsive to said logic control system, said second NOT gate connecting said input signal line to said switch element when signals received by said input signal line are data signals and when said second NOT gate is connectable to said digital interface, said second NOT gate connecting said input signal line to said switch element when signals received by said input signal line are voice signals and when said second NOT gate is connectable to said analog interface; and said switch of said switch element being double pole double throw.

107. The switching arrangement of claim 106 wherein said switch comprises at least one XOR gate, said XOR gate being responsive to said logic control system.

108. A switching arrangement for a communication platform comprising: an input signal line for receiving signals that have been received by said communication platform; a logic control system that is responsive to whether signals that are being received by said input signal line are voice signals or data signals; and a switch element having a switch, said switch element being responsive to said logic control system to cause said switch element to connect said input signal line to a digital interface when signals received by said input signal line are data signals and to cause said switch element to connect said input signal line to an analog interface when signals received by said input signal line are voice signals;

a first XOR gate that is responsive to said logic control system, said first XOR gate connecting said input signal line to said analog interface when signals received by said input signal line are voice signals and when said first XOR gate is connectable to said analog interface said first XOR gate connecting said input signal line to said digital interface when signals received by said input signal line are data signals and when said first XOR gate is connectable to said digital interface; and a second XOR gate that is responsive to said logic control system, said second XOR gate connecting said input signal line to said digital interface when signals received by said input signal line are data signals and when said second XOR gate is connectable to said digital interface, said second XOR gate connecting said input signal line to said switch element when signals received by said input signal line are voice signals and when said second XCR gate is connectable to said analog interface.

109. The switching arrangement of claim 108 wherein said communication platform includes a satellite receiver system.

110. The switching arrangement of claim 108 wherein said communication platform includes a navigation system.

111. The switching arrangement of claim 108 wherein said communication platform includes an electronic game system.

112. The switching arrangement of claim 108 wherein said switch element is integrated into a demultiplexer.

113. The switching arrangement of claim 108 wherein said switch element is integrated into a programmable logic chip.

114. The switching arrangement of claim 108 wherein said logic control system includes a function transfer filter, said function transfer filter having a first filter condition and a second filter condition, said function transfer filter assuming the first filter condition when signals that are being received by said input signal line are data signals and assuming the second filter condition when signals that are being received by said input signal line are voice signals, said switch element being responsive to said function transfer filter to cause said switch element to connect said input signal line to said digital interface when said function transfer filter assumes the first filter condition and to cause said switch element to connect said input signal line to said analog interface when said function transfer filter assumes the second filter condition.

115. The switching arrangement of claim 114 wherein said function transfer filter includes a narrow bandwidth bypass filter.

116. The switching arrangement of claim 114 wherein said function transfer filter includes an active high pass filter.

117. The switching arrangement of claim 108 wherein said logic control system is responsive to a phone number that is associated with the signal that is received by said input signal line.

118. The switching arrangement of claim 108 wherein said logic control system is responsive to a bandwidth of the signal that is received by said input signal line.

119. The switching arrangement of claim 108 wherein said logic control system is responsive to an Internet address that is associated with the signal that is received by said input signal line.

120. The switching arrangement of claim 108 wherein said logic control system is responsive to an Internet service provider number that is associated with the signal received by said input signal line.

121. The switching arrangement of claim 108 said logic control system is responsive to a remote tower identification number that is associated with the signal received by said input signal line.

122. The switching arrangement of claim 108 wherein said logic control system is responsive to a communications signature protocol that is associated with the signal received by said input signal line.

123. The switching arrangement of claim 108 wherein said logic control system is responsive to an Internet protocol address that is associated with the signal received by said input signal line.

124. The switching arrangement of claim 108 wherein said logic control system is responsive to a satellite signal identification number that is associated with the signal received by said input signal line.

125. The switching arrangement of claim 108 wherein said logic control system is responsive to a password that is associated with the signal received by said input signal line.

126. The switching arrangement of claim 108 wherein said communication platform is a mobile platform.

127. The switching arrangement of claim 108 wherein said communication platform includes a telephone system.

128. The switching arrangement of claim 108 wherein said communication platform includes a cellular telephone system.

129. The switching arrangement of claim 108 wherein said communication platform includes a television system.

130. The switching arrangement of claim 108 wherein said communication platform includes a computer system.

131. A switching arrangement for a communication platform comprising: an input signal line for receiving signals that have been received by said communication platform; a logic control system that is responsive to whether signals that are being received by said input signal line are at least one of analog and digital; and a switch element having a switch, said switch element being responsive to said logic control system to cause at least one of: said switch element connecting said input signal line to a digital interface when signals received by said input signal line are digital; and said switch element connecting said input signal line to an analog interface when signals received by said input signal line are analog;
a first NOT gate that is responsive to said logic control system, said first NOT gate connecting said input signal line to said switch element when signals received by said input signal line are analog and disconnecting said input signal line from said switch element when signals received by said input signal line are not analog; a second NOT gate that is responsive to said logic control system, said second NOT gate connecting said input signal line to said switch element when signals received by said input signal line are digital and disconnecting said input signal line from said switch element when signals received by said input signal line are not digital; and said switch of said switch element being double pole double throw.

132. The switching arrangement of claim 131 wherein said switch is at least single pole and at least double throw.

133. The switching arrangement of claim 131 wherein the signals received by said input signal line are voice signals when the signals are analog.

134. The switching arrangement of claim 131 wherein the signals received by said input signal line are data signals when the signals are digital.

135. The switching arrangement of claim 131 wherein said switch is capable of high speed switching.

136. The switching arrangement of claim 131 having both an analog interface and a digital interface and further comprising a multiplexer, said analog interface connected to said multiplexer with an analog output line, said digital interface connected to said multiplexer through a digital output line, said multiplexer connecting at least one of said analog output line and said digital output line to a signal output line for subsequent modulation and transmission by said communication platform.

137. The switching arrangement of claim 131 having both an analog interface and a digital interface and further comprising: an audio input interface for receiving signals that are analog; and a multiplexer, said audio input interface connected to said multiplexer with an audio output line, said digital interface connected to said multiplexer through a digital output line, said multiplexer connecting at least one of said audio output line and said digital output line to a signal output line for subsequent modulation and transmission by said communication platform.

138. The switching arrangement of claim 131 having an analog interface wherein at least one audio system is connected to said analog interface, said switch element connecting said input signal line to said at least one audio system through said analog interface when signals received by said input signal line are analog.

139. The switching arrangement of claim 131 having an analog interface wherein a plurality of audio systems is connected to said analog interface, said switch element connecting said input signal line to said audio systems through said analog interface when signals received by said input signal line are analog.

140. The switching arrangement of claim 131 having an analog interface wherein an audio converter is connected to said analog interface, said switch element connecting said input signal line to said audio converter through said analog interface when signals received by said input signal line are analog.

141. The switching arrangement of claim 131 having a digital interface wherein at least one network system is connected to said digital interface, said switch element connecting said input signal line to said at least one network system through said digital interface when signals received by said input signal line are digital.

142. The switching arrangement of claim 131 having a digital interface wherein said digital interface is connected to a plurality of network systems, said switch element connecting said input signal line to said network systems through said digital interface when signals received by said input signal line are digital.

143. The switching arrangement of claim 131 having a digital interface wherein a computer system is connected to said digital interface, said switch element connecting said input signal line to said computer system through said digital interface when signals received by said input signal line are digital.

144. The switching arrangement of claim 131 wherein said switch of said switch element is double pole double throw.

145. The switching arrangement of claim 131 further comprising a demodulator for demodulating signals received by said communication platform after the signals are received from said switch element by at least one of said digital interface and said analog interface.

146. The switching arrangement of claim 131 further comprising: an amplifier for amplifying signals received by said communication platform before the signals are received by said input signal line; and a demodulator for demodulating signals received by said communication platform after the signals are received from said switch element by at least one of said digital interface and said analog interface.

147. The switching arrangement of claim 131 further comprising an amplifier for amplifying signals received by said communication platform before the signals are received by said input signal line.

148. The switching arrangement of claim 131 further comprising a multiplexer having a first multiplexer condition and a second multiplexer condition, said multiplexer being responsive to said logic control system and assuming the first multiplexer condition when signals that are being received by said input signal line are digital and assuming the second multiplexer condition when signals that are being received by said input signal line are analog, said switch element being responsive to said multiplexer to cause said switch element to connect said input signal line to said digital interface when said multiplexer assumes the first multiplexer condition and to cause said switch element to connect said input signal line to said analog interface when said multiplexer assumes the second multiplexer condition.

149. A switching arrangement for a communication platform comprising: an input signal line for receiving signals that have been received by said communication platform; a logic control system that is responsive to whether signals that are being received by said input signal line are at least one of analog and digital; and a switch element having a switch, said switch element being responsive to said logic control system to cause at least one of: said switch element connecting said input signal line to a digital interface when signals received by said input signal line are digital; and said switch element connecting said input signal line to an analog interface when signals received by said input signal line are analog;
a first NOT gate that is responsive to said logic control system, said first NOT gate connecting said input signal line to said switch element when signals received by said input signal line are analog and when said first NOT gate is connectable to said analog interface, said first NOT gate connecting said input signal line to said switch element when signals received by said input signal line are digital and when said first NOT gate is connectable to said digital interface; a second NOT gate that is responsive to said logic control system, said second NOT gate connecting said input signal line to said switch element when signals received by said input signal line are digital and when said second NOT gate is connectable to said digital interface, said second NOT gate connecting said input signal line to said switch element when signals received by said input signal line are analog and when said second NOT gate is connectable to said analog interface; and said switch of said switch element being double pole double throw.

150. The switching arrangement of claim 149 wherein said switch comprises at least one XOR gate, said XOR gate being responsive to said logic control system.

151. A switching arrangement for a communication platform comprising: an input signal line for receiving signals that have been received by said communication platform; a logic control system that is responsive to whether signals that are being received by said input signal line are at least one of analog and digital; and a switch element having a switch, said switch element being responsive to said logic control system to cause at least one of: said switch element connecting said input signal line to a digital interface when signals received by said input signal line are digital; and said switch element connecting said input signal line to an analog interface when signals received by said input signal line are analog;
a first XOR gate that is responsive to said logic control system, said first XOR gate connecting said input signal line to said analog interface when signals received by said input signal line are analog and when said first XOR gate is connectable to said analog interface, said first XOR gate connecting said input signal line to said digital interface when signals received by said input signal line are digital and when said first XOR gate is connectable to said digital interface; and a second XOR gate that is responsive to said logic control system, said second XOR gate connecting said input signal line to said digital interface when signals received by said input signal line are digital and when said second XOR gate is connectable to said digital interface, said second XOR gate connecting said input signal line to said switch element when signals received by said input signal line are analog and when said second XOR gate is connectable to said analog interface.

152. The switching arrangement of claim 151 wherein said switch element is integrated into a demultiplexer.

153. The switching arrangement of claim 151 wherein said switch element is integrated into a programmable logic chip.

154. The switching arrangement of claim 151 having both an analog interface and a digital interface and further comprising a function transfer filter having a first filter condition and a second filter condition, said function transfer filter assuming the first filter condition when signals that are being received by said input signal line are digital and assuming the second filter condition when signals that are being received by said input signal line are analog, said switch element being responsive to said function transfer filter to cause said switch element to connect said input signal line to said digital interface when said function transfer filter assumes the first filter condition and to cause said switch element to connect said input signal line to said analog interface when said function transfer filter assumes the second filter condition.

155. The switching arrangement of claim 151 wherein said function transfer filter includes a narrow bandwidth bypass filter.

156. The switching arrangement of claim 151 wherein said function transfer filter includes an active high pass filter.

157. The switching arrangement of claim 151 wherein said logic control system is responsive to a phone number that is associated with the signal received by said input signal line.

158. The switching arrangement of claim 151 wherein said logic control system is responsive to a bandwidth of the signal that is received by said input signal line.

159. The switching arrangement of claim 151 wherein said logic control system is responsive to an Internet address that is associated with the signal received by said input signal line.

160. The switching arrangement of claim 151 wherein said logic control system is responsive to an Internet service provider number that is associated with the signal received by said input signal line.

161. The switching arrangement of claim 151 wherein said logic control system is responsive to a remote tower identification number that is associated with the signal received by said input signal line.

162. The switching arrangement of claim 151 wherein said logic control system is responsive to a communications signature protocol that is associated with the signal received by said input signal line.

163. The switching arrangement of claim 151 wherein said logic control system is responsive to an Internet protocol address that is associated with the signal received by said input signal line.

164. The switching arrangement of claim 151 wherein said logic control system is responsive to a satellite signal identification number that is associated with the signal received by said input signal line.

165. The switching arrangement of claim 151 wherein said logic control system is responsive to a password that is associated with the signal received by said input signal line.

166. The switching arrangement of claim 151 wherein said communication platform is a mobile platform.

167. The switching arrangement of claim 151 wherein said communication platform includes a telephone system.

168. The switching arrangement of claim 151 wherein said communication platform includes a cellular telephone system.

169. The switching arrangement of claim 151 wherein said communication platform includes a television system.

170. The switching arrangement of claim 151 wherein said communication platform includes a computer system.

171. The switching arrangement of claim 151 wherein said communication platform includes a navigation system.

172. The switching arrangement of claim 151 wherein said communication platform includes a satellite receiver system.

173. The switching arrangement of claim 151 wherein said communication platform includes an electronic game system.

\* \* \* \* \*